United States Patent [19]

Okamoto

[11] Patent Number: 5,119,180
[45] Date of Patent: Jun. 2, 1992

[54] IMAGE PROCESSING SYSTEM WITH ARBITRARY AND ADJACENT PICTURE ELEMENT SIGNAL LOAD FACTORING

[75] Inventor: Satoru Okamoto, Tokyo, Japan

[73] Assignee: Fuji Photo Film Co., Ltd., Kanagawa, Japan

[21] Appl. No.: 450,565

[22] Filed: Dec. 14, 1989

[30] Foreign Application Priority Data

Dec. 21, 1988 [JP] Japan .................. 63-320545

[51] Int. Cl.$^5$ .................................. H04S 9/04
[52] U.S. Cl. ........................ 358/41; 358/43; 358/48; 358/44; 358/209
[58] Field of Search ............ 358/44, 45, 46, 47, 358/43, 213.14, 213.17, 213.18, 213.22, 213.26, 48, 49, 41, 30

[56] References Cited

U.S. PATENT DOCUMENTS

| 4,725,881 | 2/1988 | Buchwald | 358/50 |
| 4,924,316 | 5/1990 | Kobayashi et al. | 358/90 |

FOREIGN PATENT DOCUMENTS 61-189787  8/1986  Japan .
63-157596  6/1988  Japan .
63-199590  8/1988  Japan .
63-199591  8/1988  Japan .

Primary Examiner—Howard W. Britton
Assistant Examiner—Tuan V. Ho

[57] ABSTRACT

An image processing system which generates a luminance signal and a color difference signal based on chrominance signals read from an image pick-up device. The image pick-up device includes a green striped and red/blue perfectly checkered filter arrangememt, or a similar filter having an arrangement of complementary colors. In the image processing system, a luminance signal and a color difference signal corresponding to an arbitrary picture element are formed by performing arithmetic operations in which a corresponding signal generated from the arbitrary picture element, and a plurality of signals generated from adjacent picture elements with respect to the arbitrary element, are added together after the generated signals are multiplied with respective suitable load factors. The image processing system provides improved resolution and helps prevent the occurrence of spurious colors on a processed image.

15 Claims, 5 Drawing Sheets

FIG. 3

| n → | 0 | 1 | 2 | 3 | 4 | 5 | 6 | 7 | 8 | --- N |
|---|---|---|---|---|---|---|---|---|---|---|
| m ↓ 0 | $G_{00}$ | $R_{01}$ | $G_{02}$ | $B_{03}$ | $G_{04}$ | $R_{05}$ | $G_{06}$ | $B_{07}$ | $G_{08}$ | ---- |
| 1 | $G_{10}$ | $B_{11}$ | $G_{12}$ | $R_{13}$ | $G_{14}$ | $B_{15}$ | $G_{16}$ | $R_{17}$ | $G_{18}$ | ---- |
| 2 | $G_{20}$ | $R_{21}$ | $G_{22}$ | $B_{23}$ | $G_{24}$ | $R_{25}$ | $G_{26}$ | $B_{27}$ | $G_{28}$ | ---- |
| 3 | $G_{30}$ | $B_{31}$ | $G_{32}$ | $R_{33}$ | $G_{34}$ | $B_{35}$ | $G_{36}$ | $R_{37}$ | $G_{38}$ | ---- |
| 4 | $G_{40}$ | $R_{41}$ | $G_{42}$ | $B_{43}$ | $G_{44}$ | $R_{45}$ | $G_{46}$ | $B_{47}$ | $G_{48}$ | ---- |
| 5 | $G_{50}$ | $B_{51}$ | $G_{52}$ | $R_{53}$ | $G_{54}$ | $B_{55}$ | $G_{56}$ | $R_{57}$ | $G_{58}$ | ---- |
| 6 | $G_{60}$ | $R_{61}$ | $G_{62}$ | $B_{63}$ | $G_{64}$ | $R_{65}$ | $G_{66}$ | $B_{67}$ | $G_{68}$ | ---- |
| 7 | $G_{70}$ | $B_{71}$ | $G_{72}$ | $R_{73}$ | $G_{74}$ | $B_{75}$ | $G_{76}$ | $R_{77}$ | $G_{78}$ | ---- |
| 8 | $G_{80}$ | $R_{81}$ | $G_{82}$ | $B_{83}$ | $G_{84}$ | $R_{85}$ | $G_{86}$ | $B_{87}$ | $G_{88}$ | ---- |
| ⋮ M | ---- | ---- | ---- | ---- | ---- | ---- | ---- | ---- | ---- | |

FIG. 4

| $G_{00}$ | $R_{01}$ | $G_{02}$ | $B_{03}$ |
|---|---|---|---|
| $G_{10}$ | $B_{11}$ | $G_{12}$ | $R_{13}$ |
| $G_{20}$ | $R_{21}$ | $G_{22}$ | $B_{23}$ |
| $G_{30}$ | $B_{31}$ | $G_{32}$ | $R_{33}$ |
| $G_{40}$ | $R_{41}$ | $G_{42}$ | $B_{43}$ |

FIG. 5

| $G_{00}$ | $R_{01}$ | $G_{02}$ | $B_{03}$ | $G_{04}$ |
|---|---|---|---|---|
| $G_{10}$ | $B_{11}$ | $G_{12}$ | $R_{13}$ | $G_{14}$ |
| $G_{20}$ | $R_{21}$ | $G_{22}$ | $B_{23}$ | $G_{24}$ |
| $G_{30}$ | $B_{31}$ | $G_{32}$ | $R_{33}$ | $G_{34}$ |
| $G_{40}$ | $R_{41}$ | $G_{42}$ | $B_{43}$ | $G_{44}$ |

FIG. 6

| $G_{00}$ | $R_{01}$ | $G_{02}$ | $B_{03}$ | $G_{04}$ |
|---|---|---|---|---|
| $G_{10}$ | $B_{11}$ | $G_{12}$ | $R_{13}$ | $G_{14}$ |
| $G_{20}$ | $R_{21}$ | $G_{22}$ | $B_{23}$ | $G_{24}$ |
| $G_{30}$ | $B_{31}$ | $G_{32}$ | $R_{33}$ | $G_{34}$ |
| $G_{40}$ | $R_{41}$ | $G_{42}$ | $B_{43}$ | $G_{44}$ |

FIG. 7

| G$_{00}$ | R$_{01}$ | G$_{02}$ | B$_{03}$ |
|---|---|---|---|
| G$_{10}$ | B$_{11}$ | G$_{12}$ | R$_{13}$ |
| G$_{20}$ | R$_{21}$ | G$_{22}$ | B$_{23}$ |
| G$_{30}$ | B$_{31}$ | G$_{32}$ | R$_{33}$ |
| G$_{40}$ | R$_{41}$ | G$_{42}$ | B$_{43}$ |

FIG. 8

| G$_{00}$ | R$_{01}$ | G$_{02}$ | B$_{03}$ | G$_{04}$ |
|---|---|---|---|---|
| G$_{10}$ | B$_{11}$ | G$_{12}$ | R$_{13}$ | G$_{14}$ |
| G$_{20}$ | R$_{21}$ | G$_{22}$ | B$_{23}$ | G$_{24}$ |
| G$_{30}$ | B$_{31}$ | G$_{32}$ | R$_{33}$ | G$_{34}$ |
| G$_{40}$ | R$_{41}$ | G$_{42}$ | B$_{43}$ | G$_{44}$ |

FIG. 9

| G$_{00}$ | R$_{01}$ | G$_{02}$ | B$_{03}$ |
|---|---|---|---|
| G$_{10}$ | B$_{11}$ | G$_{12}$ | R$_{13}$ |
| G$_{20}$ | R$_{21}$ | G$_{22}$ | B$_{23}$ |
| G$_{30}$ | B$_{31}$ | G$_{32}$ | R$_{33}$ |
| G$_{40}$ | R$_{41}$ | G$_{42}$ | B$_{43}$ |

FIG. 10

| G$_{00}$ | R$_{01}$ | G$_{02}$ | B$_{03}$ | G$_{04}$ |
|---|---|---|---|---|
| G$_{10}$ | B$_{11}$ | G$_{12}$ | R$_{13}$ | G$_{14}$ |
| G$_{20}$ | R$_{21}$ | G$_{22}$ | B$_{23}$ | G$_{24}$ |
| G$_{30}$ | B$_{31}$ | G$_{32}$ | R$_{33}$ | G$_{34}$ |
| G$_{40}$ | R$_{41}$ | G$_{42}$ | B$_{43}$ | G$_{44}$ |

FIG. 12

| G | R | G | B | G | R | G | B |
|---|---|---|---|---|---|---|---|
| G | B | G | R | G | B | G | R |
| G | R | G | B | G | R | G | B |
| G | B | G | R | G | B | G | R |
| G | R | G | B | G | R | G | B |
| G | B | G | R | G | B | G | R |
| G | R | G | B | G | R | G | B |
| G | B | G | R | G | B | G | R |

FIG. 13

| G | X | G | X | G | X | G | X |
|---|---|---|---|---|---|---|---|
| G | X | G | X | G | X | G | X |
| G | X | G | X | G | X | G | X |
| G | X | G | X | G | X | G | X |
| G | X | G | X | G | X | G | X |
| G | X | G | X | G | X | G | X |
| G | X | G | X | G | X | G | X |
| G | X | G | X | G | X | G | X |

FIG. 14

| X | R | X | X | X | R | X | X |
|---|---|---|---|---|---|---|---|
| X | X | X | R | X | X | X | R |
| X | R | X | X | X | R | X | X |
| X | X | X | R | X | X | X | R |
| X | R | X | X | X | R | X | X |
| X | X | X | R | X | X | X | R |
| X | R | X | X | X | R | X | X |
| X | X | X | R | X | X | X | R |

FIG. 15

| X | X | X | B | X | X | X | B |
|---|---|---|---|---|---|---|---|
| X | B | X | X | X | B | X | X |
| X | X | X | B | X | X | X | B |
| X | B | X | X | X | B | X | X |
| X | X | X | B | X | X | X | B |
| X | B | X | X | X | B | X | X |
| X | X | X | B | X | X | X | B |
| X | B | X | X | X | B | X | X |

FIG. 16 n →

| m | 0 | 1 | 2 | 3 | 4 | 5 | 6 | 7 | 8 | --- N |
|---|---|---|---|---|---|---|---|---|---|---|
| 0 | X | R | X | X | X | R | X | X | X | |
| 1 | X | X | X | R | X | X | X | R | X | |
| 2 | X | R | X | X | X | R | X | X | X | |
| 3 | X | X | X | R | X | X | X | R | X | |
| 4 | X | R | X | X | X | R | X | X | X | |
| 5 | X | B | X | X | X | X | X | X | X | |
| 6 | X | X | X | B | X | X | X | B | X | |
| 7 | X | B | X | X | X | B | X | X | X | |
| 8 | X | X | X | B | X | X | X | B | X | |
| M | | | | | | | | | | |

UPPER SIDE ↑↓ LOWER SIDE

IMAGE PROCESSING SYSTEM WITH ARBITRARY AND ADJACENT PICTURE ELEMENT SIGNAL LOAD FACTORING

FIELD OF THE INVENTION

The present invention relates to an image processing system in which a luminance signal and a color difference signal are formed based on a color picture signal generated by a single plate or signal tube image pickup device.

BACKGROUND OF THE INVENTION

A single plate or single tube image pickup device serves to generate a picture signal for every picture element in synchronism with well know read-out scanning.

This type of image pickup device has a light receiving plane provided with a color filter means opposite a plane of incidence of an optical image of a subject. For example, the light receiving plane is formed by light-receiving elements corresponding to respective picture elements. For example, the color filter means is composed of red, blue and green groups of fine filters respectively arranged corresponding to the picture elements, so that a color picture signal is generated in the form of a multiplex signal. Accordingly, this type of image pickup device serves to separate chrominance signals corresponding to respective colors and also serves to form a luminance signal and a color difference signal based on the chrominance signals thus separated.

The arrangement of fine filters for respective color phases in the color filter results in poor resolution and the occurrence of spurious colors. Further, similar effects may be produced as a result of the method of processing the read-out color picture signal.

As a counter measure to the aforementioned problem, an invention relating to the arrangement of the color filter means has been disclosed in Japanese Patent Unexamined Publication No. 62-140585 which results in improvement of resolution and the reduction of spurious colors. According to the disclosed invention, there is provided a charge-coupled solid-state image pickup device (CCD) including green striped filters provided corresponding to odd columns (or even columns) of picture elements arranged along the vertical charge-transference direction thereof and red and blue mosaic filters arranged alternately along the vertical charge-transference direction and the horizontal direction perpendicular thereto. This arrangement is called "green striped and red/blue perfectly-checkered filter arrangement". The occurrence of wavy patterns can be reduced by the color filter means without lowering the resolution in the vertical direction because the vertical sampling period of the respective color filter is equal to the vertical picture element period.

A theory of occurrence of spurious colors is now described in the case of using an image pickup device having a perfectly-checkered filter arrangement according to the Japanese Patent Unexamined Publication No. 62-140585.

FIG. 12 shows a perfectly-checkered filter arrangement. When a luminance signal Y is formed based on chrominance signals read from the image pickup device having such a filter arrangement, it is required that the upper limit of the frequency band of the luminance signal Y extends near a frequency half that of the sampling frequency $f_s$ (that is, $f_s/2$). Accordingly, it is a general practice that the cut-off frequency of a low-pass filter for setting the frequency band of the luminance signal Y is established to be $f_s/2$.

When, for example, an image of a perfectly green subject is picked up under the aforementioned condition, chrominance signals of green are detected from picture elements having green (G) filters but no chrominance is detected from other picture elements having red (R) and blue (B) filters as shown in FIG. 13. This is because the red and green filters do not transmit green light. In the drawing, the symbol X represents portions corresponding to the red and blue picture elements, in which no signal appears.

If a high-band luminance signal having the sampling frequency $f_s$ is used for the reproduction of an image, the red (R) and blue (B) portions become black so that a green striped image is reproduced even though the subject is green. When the cut-off frequency of the low-pass filter is established to be $f_s/2$, the red (R) and blue (B) filter portions are changed to green to make it possible to reproduce the green subject.

As described above, the limitation of the frequency band of the luminance signal Y to a frequency half the sampling frequency $f_s$ is very effective in the case where such a green subject is reproduced. When the same analysis as described above is applied to the case where an image of a red subject is picked up, chrominance signals are not generated in picture elements corresponding to the green and blue filters. Accordingly, if a luminance signal having the sampling frequency $f_s$ is formed to reproduce an image, red spots corresponding to the red filters appear on the black screen which make it impossible to reproduce the red subject. Furthermore, a problem arises as follows. Red signals are generated at a quarter of the sampling frequency as shown in FIG. 14 though the frequency band of the luminance signal Y is limited to half that of the sampling frequency. Accordingly, the red signals pass through the $f_s/2$ low-pass filter and it is impossible to limit the frequency band. As a result, the red subject is reproduced in the form of red spots.

Further, in the case where an image of a blue subject is picked up, blue signals are generated as shown in FIG. 15. Accordingly, in this case, the same problem as described above with reference to FIG. 14 arises. When an ordinary subject containing many colors is picked up under the condition that color phases cannot be correctly reproduced as described above, spurious colors are produced.

If the frequency band of the luminance signal Y is limited to a quarter ($f_s/4$) of the sampling frequency in order to be matched with the red and blue spatial frequency for the purpose of solving the aforementioned problem, the lowering of resolution or color reproducibility becomes a major problem in the case where a polycolor image of an ordinary subject containing many colors is picked up. However, it is not a major problem in the case where a monocolor image of a subject not requiring high resolution and having one color, red, blue or green is picked up.

Under such circumstances, an object of the present invention is to provide a signal processing system for forming a luminance signal and a color difference signal based on a color picture signal generated from a single plate or single tube image pickup device using a perfectly checkered arrangement color filter means to thereby make it possible to improve reproducibility and reduce spurious colors.

SUMMARY OF THE INVENTION

To attain the foregoing object, the present invention comprises an image processing system in which a luminance signal and a color difference signal are formed based on chrominance signals read from an image pickup device using a green striped and red/blue perfectly checkered filter arrangement or a filter means having an arrangement of complementary colors. In this image processing system, a luminance signal and a color difference signal corresponding to an arbitrary picture element are formed by 1) performing a predetermined arithmetic operation whenever chrominance signals are generated from at least two picture elements adjacent to each other in the vertical direction of the filter arrangement, or 2) performing a predetermined arithmetic operation whenever chrominance signals are generated from at least two picture elements vertically adjacent to each other in the filter arrangement and other picture elements horizontally or diagonally adjacent to each other with respect to the arbitrary picture element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 2(a) through 1(d) are frequency characteristic graphs of luminance signals and color difference signals formed according to the invention;

FIG. 3 is an explanatory view showing the color filter arrangement used in the invention;

FIGS. 4 through 10 are explanatory views showing the theory of operation of the invention;

FIGS. 12 through 16 are explanatory views illustrating the problems corrected by the present invention.

DETAILED DESCRIPTION OF THE PRESENT INVENTION

Figure 1:
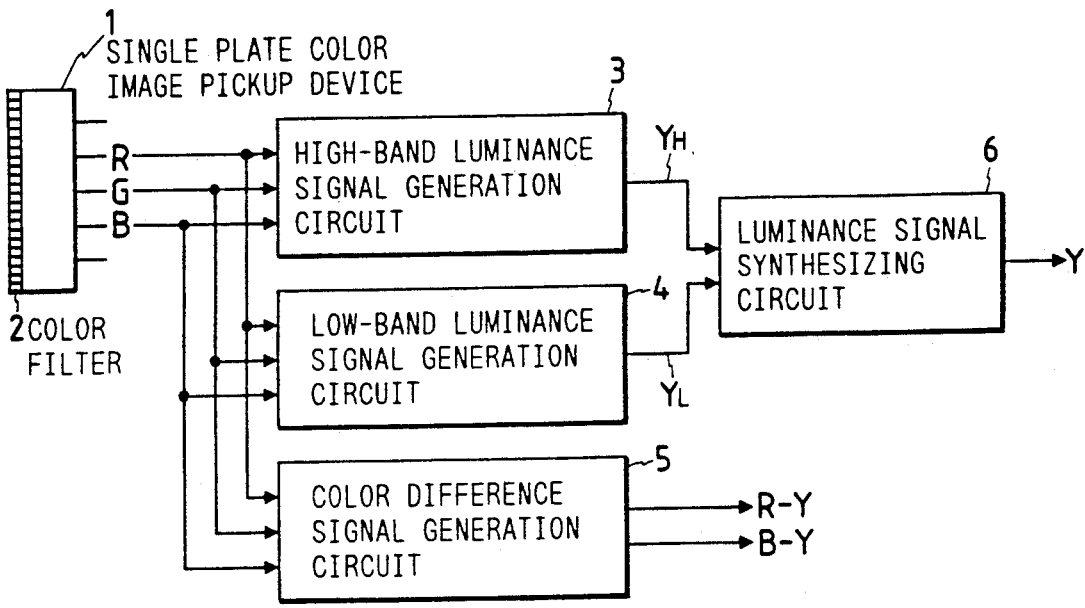
FIG. 1 is a block diagram of an embodiment of the image processing system of the present invention.

FIGS. 1 through 3 are views showing the configuration of the image processing system according to the present invention and the theory of processing in the system. The case shown in the drawings is that where a green striped and red/blue perfectly checkered filter arrangement is employed.

The construction will be now described. In FIG. 1, the reference numeral 1 designates a single plate or single tube color image pickup device having a mosaic color filter means 2 of predetermined arrangement provided on a light-receiving plane for receiving an optical image of a subject.

For example, as shown in FIG. 3, the color filter means 2 is composed of red (R), green (G) and blue (B) fine filters respectively provided on the light-receiving plane of light-receiving elements corresponding to the respective picture elements. Green striped filters $G_{00}$, $G_{10}$, $G_{20}$, ..., $G_{02}$, $G_{12}$, $G_{22}$, ..., $G_{04}$, $G_{14}$, $G_{24}$, ..., etc., are provided corresponding to even-column groups of light-receiving elements arranged along the vertical scanning direction m. Red (R) and blue (B) fine filters are provided on odd-column groups of light-receiving elements between the striped filters so as to be arranged to alternate perfectly in the vertical and horizontal scanning directions m and n. When, on the contrary, green striped filters are arranged in odd columns, red (R) and blue (B) fine filters are arranged in even columns. In FIG. 3, the subscripts to the symbols R, G and B representing red, green and blue filters show the positions of the respective fine filters in the vertical and horizontal scanning directions m and n based on the green filter $G_{00}$ located in the left uppermost position in the drawing. In other words, the positions of the fine filters are respectively represented by variables m (from 0 to M) and n (from 0 to N) when the filters are represented by $R_{mn}$, $G_{mn}$ and $B_{mn}$.

Chrominance signals R, G and B, or chrominance signals Ma, Ye and C as complementary colors in the case where the filters are complementary color filters, read from the image pickup device 1 by horizontal and vertical scanning are fed to a high-band luminance signal generation circuit 3, a low-band luminance signal generation circuit 4 and a color difference signal generation circuit 5, as shown in FIG. 1. The high-band luminance signal generation circuit 3 forms a high-band luminance signal $Y_H$ from a chrominance signal having the highest spatial frequency component in the chrominance signals. The low-band luminance signal generation circuit 4 forms a low-band luminance signal $Y_L$ from all of the chrominance signals. Accordingly, the high-band luminance signal $Y_H$ contains wide-band frequency components from a low-band frequency to a high-band frequency and, on the other hand, the low-band luminance signal $Y_L$ contains lower-band frequency components than the frequency components of the high-band luminance signal $Y_H$.

Figure 2A:
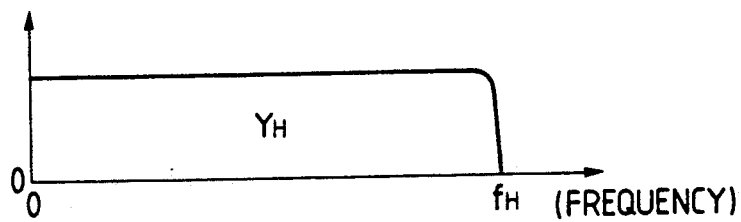
Figure 2B:
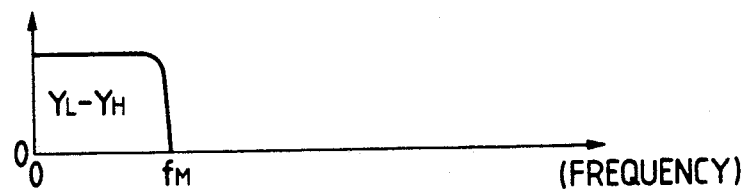
Figure 2C:
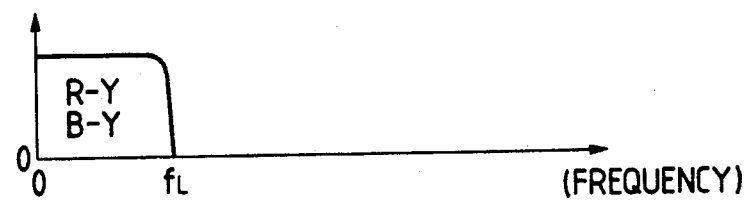
Figure 2D:
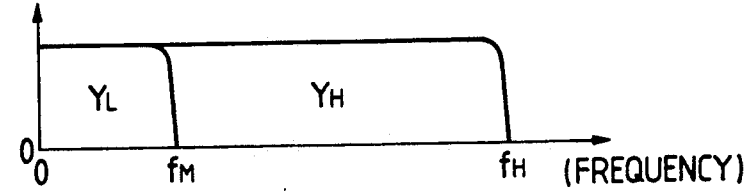

The high-band and low-band luminance signals $Y_H$ and $Y_L$ are fed to a luminance signal synthesizing circuit 6 to form a final luminance signal Y in which the low band containing frequencies lower than $f_M$ as shown in FIG. 2(d) is formed from the components of the low-band luminance signal $Y_L$ and the high band is formed from the components of the high-band luminance signal. The synthesizing procedure is carried out as follows. The frequency band of the high-band luminance signal $Y_H$ is limited by a low-pass filter having a cut-off frequency ($f_H = f_s/2$) which is half the sampling frequency $f_s$ as shown in FIG. 2(a). At the same time, the frequency band of the low-band luminance signal $Y_L$ is limited by a low-pass filter having a cut-off frequency $f_M$ lower than the cut-off frequency $f_L$. Then, a signal ($Y_L - Y_H$) having the cut-off frequency $f_M$ as shown in FIG. 2(b) is formed by subtracting the high-band luminance signal $Y_H$ from the low-band luminance signal $Y_L$. A luminance signal Y having low-band components is then formed from the low-band luminance signal $Y_L$ and high-band components formed from the high-band luminance signal $Y_H$ as shown in FIG. 2(d) by adding the high-band luminance signal $Y_H$ to the signal $(Y_L - Y_H)$.

The color difference signal generation circuit 5 forms a color difference signal having a cut-off frequency $f_L$ ($f_L \cong f_M$) as shown in FIG. 2(c).

In the following, a theory of formation of various signals $Y_H$, $Y_L$, $R-Y$ and $B-Y$ in the high-band luminance signal generation circuit 3, the low-band luminance signal generation circuit 4 and the color difference signal generation circuit 5, respectively, is described.

The high-band luminance signal generation circuit 3 performs an arithmetic operation represented by the following equations (1) through (3) on chrominance signals, hereinafter respectively represented by $R_{mn}$, $G_{mn}$ and $B_{mn}$ in the filter arrangement, generated corresponding to the filters $R_{mn}$, $G_{mn}$ and $B_{mn}$ as shown in FIG. 3, to thereby form high-band luminance signals $Y_{mn}$, in which m and n represent the position of an arbitrary picture element, pertaining to all of the picture elements.

In FIG. 3, high-band luminance signals $Y_{Hmn}$ from the respective picture elements corresponding to the green striped filters are calculated by the equation (1).

$$Y_{Hmn} = k_{01} \cdot (G_{mn} + G_{(m+1)n}) \tag{1}$$

In the above equation (1), $K_{01}$ represents a load factor as will be described later. For example, high-band luminance signals $Y_{H10}$, $Y_{H20}$, $Y_{H12}$ and $Y_{H22}$ from picture elements corresponding to the filters $G_{10}$, $G_{20}$, $G_{12}$ and $G_{22}$ in FIG. 3 are calculated by the equation (1) as follows.

$$Y_{H10} = k_{01} \cdot (G_{10} + G_{20}),$$

$$Y_{H20} = k_{01} \cdot (G_{20} + G_{30}),$$

$$Y_{H12} = k_{01} \cdot (G_{12} + G_{22}), \text{ and}$$

$$Y_{H22} = k_{01} \cdot (G_{22} + G_{32}).$$

Other high-band luminance signals are formed in the same manner as described above. In short, the high-band luminance signals $Y_{Hmn}$ corresponding to all of the green picture elements are formed based on chrominance signals $G_{mn}$ and adjacent green chrominance signals $G_{(m+1)n}$ without using red and blue chrominance signals.

In FIG. 3, high-band luminance signals $Y_{Hmn}$ from the respective picture elements corresponding to the red filters $R_{mn}$ are calculated by the equation (2).

$$Y_{Hmn} = k_{02} \cdot (R_{mn} + B_{(m+1)n}) \tag{2}$$

For example, high-band luminance signals $Y_{H21}$, $Y_{H13}$ and $Y_{H33}$ from picture elements corresponding to the filters $R_{21}$, $R_{13}$ and $R_{33}$ respectively in FIG. 3 are calculated by the equation (2) as follows.

$$Y_{H21} = k_{02} \cdot (R_{21} + B_{31}),$$

$$Y_{H13} = k_{02} \cdot (R_{13} + B_{23}), \text{ and}$$

$$Y_{H33} = k_{02} \cdot (R_{33} + B_{43}).$$

Other high-band luminance signals are formed in the same manner as described above.

In FIG. 3, high-band luminance signals $Y_{Hmn}$ from the respective picture elements corresponding to the blue filters $B_{mn}$ are calculated by the equation (3).

$$Y_{Hmn} = k_{03} \cdot (R_{(m+1)n} + B_{nm}) \tag{3}$$

For example, high-band luminance signals $Y_{H11}$, $Y_{H31}$ and $Y_{H23}$ from picture elements corresponding to the filters $B_{11}$, $B_{31}$ and $B_{23}$ in FIG. 3 are calculated by the equation (3) as follows.

$$Y_{H11} = k_{03} \cdot (R_{21} + B_{11}),$$

$$Y_{H31} = k_{03} \cdot (R_{41} + B_{31}), \text{ and}$$

$$Y_{H23} = k_{03} \cdot (R_{33} + B_{23}).$$

Other high-band luminance signals are formed in the same manner as described above.

As described above, high-band luminance signals $Y_{Hmn}$ corresponding to all of the picture elements are calculated by the above equations (1) through (3).

It is apparent from FIGS. 15 and 16 that when two chrominance signals adjacent to each other in the vertical direction in the filter arrangement are added to each other after being multiplied by load factors as described above, a luminance signal can be formed based on a chrominance signal detected from the adjacent picture element though chrominance signals cannot be detected from portions represented by X in the vertical direction. Accordingly, reproducibility in the horizontal direction can be improved.

Although the aforementioned calculation of a high-band luminance signal according to the equations (1) through (3) is carried out based on two chrominance signals vertically adjacent to each other, a theory of formation of a high-band luminance signal based on three vertically adjacent chrominance signals will be described hereunder.

In FIG. 3, high-band luminance signals $Y_{Hmn}$ from picture elements corresponding to the green striped filters are calculated by the following equation (4).

$$Y_{Hmn} = k_{04} \cdot G_{mn} + k_{05} \cdot (G_{(m-1)n} + G_{(m+1)n}) \tag{4}$$

For example, high-band luminance signals $Y_{H10}$, $Y_{H20}$, $Y_{H12}$ and $Y_{H22}$ from picture elements corresponding to the filters $G_{10}$, $G_{20}$, $G_{12}$ and $G_{22}$, as shown in FIG. 4, are calculated by the equation (4) as follows.

$$Y_{H10} = k_{04} \cdot G_{10} + k_{05} \cdot (G_{00} + G_{20}),$$

$$Y_{H20} = k_{04} \cdot G_{20} + k_{05} \cdot (G_{10} + G_{30}),$$

$$H_{H12} = k_{04} \cdot G_{12} + k_{05} \cdot (G_{02} + G_{22}), \text{ and}$$

$$Y_{H22} = k_{04} \cdot G_{22} + k_{05} \cdot (G_{12} + G_{32}).$$

Other high-band luminance signals are formed in the same manner as described above. In short, high-band luminance signals $Y_{Hmn}$ corresponding to all of the green picture elements are formed based on chrominance signals $G_{mn}$ and green chrominance signals $G_{(m-1)n}$ and $G_{(m+1)n}$ adjacent thereto without using red and blue chrominance signals.

In FIG. 3, high-band luminance signals $Y_{Hmn}$ from picture elements corresponding to the red filters $R_{mn}$ are calculated by the following equation (5).

$$Y_{Hmn} = k_{06} \cdot R_{mn} + k_{07} \cdot (B_{(m-1)n} + B_{(m+1)n}) \tag{5}$$

For example, high-band luminance signals $Y_{H21}$, $Y_{H13}$ and $Y_{H33}$ from picture elements corresponding to the filters $R_{21}$, $R_{13}$ and $R_{33}$ as shown in FIG. 5 are calculated by the equation (5) as follows.

$$Y_{H21} = k_{06} \cdot R_{21} + k_{07} \cdot (B_{11} + B_{31}),$$

$$Y_{H13} = k_{06} \cdot R_{13} + k_{07} \cdot (B_{03} + B_{23}), \text{ and}$$

$$Y_{H33} = k_{06} \cdot R_{33} + k_{07} \cdot (B_{23} + B_{43}).$$

Other high-band luminance signals are formed in the same manner as described above. In short, high-band luminance signals $Y_{Hmn}$ corresponding to all of the red picture elements are formed based on chrominance signals $R_{mn}$ and blue chrominance signals $B_{(m-1)n}$ and $B_{(m+1)n}$ adjacent thereto without using green chrominance signals.

In FIG. 3, high-band luminance signals $Y_{Hmn}$ from picture elements corresponding to the blue filters $B_{mn}$ are calculated by the following equation (6).

$$Y_{Hmn} = k_{08} \cdot B_{mn} + k_{09} \cdot (R_{(m-1)n} + R_{(m+1)n}) \qquad (6)$$

For example, high-band luminance signals $Y_{H11}$, $Y_{H31}$ and $Y_{H23}$ from picture elements corresponding to the filters $B_{11}$, $B_{31}$ and $B_{23}$ as shown in FIG. 6 are calculated by the equation (6) as follows.

$$Y_{H11} = k_{08} \cdot B_{11} + k_{09} \cdot (R_{01} + R_{21}),$$

$$Y_{H31} = k_{08} \cdot B_{31} + k_{09} \cdot (R_{21} + R_{41}), \text{ and}$$

$$Y_{H23} = k_{08} \cdot B_{23} + k_{09} \cdot (R_{13} + R_{33}).$$

Other high-band luminance signals are formed in the same manner as described above. In short, high-band luminance signals $Y_{Hmn}$ corresponding to all of the blue picture elements are formed based on chrominance signals $R_{mn}$ and blue chrominance signals $B_{(m-1)n}$ and $B_{(m+1)n}$ adjacent thereto without using green chrominance signals.

As described above, high-band luminance signals $Y_{Hmn}$ corresponding to all of the picture elements are calculated by the equations (4) through (6).

When a high-band luminance signal is formed based on chrominance signals pertaining to three picture elements vertically adjacent to one another as described above, the reproducibility of the high-band luminance signal pertaining to picture elements in the horizontal direction can be improved.

Assuming now that red and blue are respectively picked up through vertically upper-side and lower-side picture element groups in FIG. 3, in the case where an image of a subject containing two colors is picked up, chrominance signals R and B are respectively detected from the upper-side red picture elements (from m=0 to m=4 in FIG. 16) and the lower-side blue picture elements (m=5), as shown in FIG. 16, at the boundary of the two colors. If the aforementioned equations (1) through (3) are applied, high-band luminance signals pertaining to odd-column picture elements of n=1, 5, . . . can be formed but chrominance signals pertaining to other odd-column picture elements of n=3, 7, . . . cannot be detected at the boundary (m=4 and 5). Consequently, resolution is reduced to a quarter of the resolution of the picture elements. In short, luminance signals at the boundary cannot be formed though a trial is made to form high-band luminance signals according to the equations (1) through (3).

If a high-band luminance signal is formed based on chrominance signals generated from three picture elements vertically adjacent to one another according to the equations (4) through (6), at least one chrominance signal in the boundary can be used in the calculation of the high-band luminance signal. Accordingly, high-band luminance signals pertaining to all of the picture elements can be formed to thus attain improvement in horizontal resolution.

A theory of formation of a low-band luminance signal in the low-band luminance signal generation circuit 4 will be described hereunder with reference to the following equations (7) through (10). This method is a method for forming a low-band luminance signal $Y_L$ based on chrominance signals pertaining to three picture elements horizontally and vertically adjacent to one another.

In FIG. 3, low-band luminance signals $Y_{Lmn}$ corresponding to picture elements G in a portion where a filter G is followed by an adjacent filter R are calculated by the equation (7).

$$Y_{Lmn} = k_{10} \cdot R_{m(n+1)} + k_{11} \cdot G_{mn} + k_{12} \cdot B_{(m+1)(n+1)} \qquad (7)$$

For example, low-band luminance signals $Y_{L20}$, $Y_{L12}$ and $Y_{L32}$ from picture elements corresponding to the filters $G_{20}$, $G_{12}$ and $G_{32}$ as shown in FIG. 3 are calculated by the equation (7) as follows.

$$Y_{L20} = k_{10} \cdot R_{21} + k_{11} \cdot G_{20} + k_{12} \cdot B_{31},$$

$$Y_{L12} = k_{10} \cdot R_{13} + k_{11} \cdot G_{12} + k_{12} \cdot B_{23}, \text{ and}$$

$$Y_{L32} = k_{10} \cdot R_{33} + k_{11} \cdot G_{32} + k_{12} \cdot B_{43}.$$

All low-band luminance signals in intersections of other G/R rows and G columns are formed in the same manner as described above.

In FIG. 3, low-band luminance signals $Y_{Lmn}$ corresponding to picture elements R in a portion where filters G and R are adjacent to each other are calculated by the equation (8).

$$Y_{Lmn} = k_{13} \cdot R_{mn} + k_{14} \cdot G_{m(n+1)} + k_{15} \cdot B_{(m+1)n} \qquad (8)$$

For example, low-band luminance signals $Y_{L21}$, $Y_{L13}$ and $Y_{L33}$ from picture elements corresponding to the filters $R_{21}$, $R_{13}$ and $R_{33}$ as shown in FIG. 3 are calculated by the equation (8) as follows.

$$Y_{L21} = k_{13} \cdot R_{21} + k_{14} \cdot G_{22} + k_{15} \cdot B_{32},$$

$$Y_{L13} = k_{13} \cdot R_{13} + k_{14} \cdot G_{14} + k_{15} \cdot B_{23}, \text{ and}$$

$$Y_{L33} = k_{13} \cdot R_{33} + k_{14} \cdot G_{34} + k_{15} \cdot B_{43}.$$

All low-band luminance signals in intersections of other G/R rows and R columns are formed in the same manner as described above.

In FIG. 3, low-band luminance signals $Y_{Lmn}$ corresponding to picture elements G in a portion where a filter G is followed by an adjacent filter B are calculated by the equation (9).

$$Y_{Lmn} = k_{16} \cdot R_{(m+1)(n+1)} + k_{17} \cdot G_{mn} + k_{18} \cdot B_{m(n+1)} \qquad (9)$$

For example, low-band luminance signals $Y_{L10}$, $Y_{L30}$ and $Y_{L22}$ from picture elements corresponding to the filters $G_{10}$, $G_{30}$ and $G_{22}$ as shown in FIG. 3 are calculated by the equation (9) as follows.

$Y_{L10} = k_{16} \cdot R_{21} + k_{17} \cdot G_{10} + k_{18} \cdot B_{11}$, $Y_{L30} = k_{16} \cdot R_{41} + k_{17} \cdot G_{30} + k_{18} \cdot B_{31}$, and $Y_{L22} = k_{16} \cdot R_{33} + k_{17} \cdot G_{22} + k_{18} \cdot B_{23}$.

All low-band luminance signals in intersections of other G/B rows and G columns are formed in the same manner as described above.

In FIG. 3, low-band luminance signals $Y_{Lmn}$ corresponding to picture elements B in a portion where filters G and B are adjacent to each other are calculated by the equation (10).

$$Y_{Lmn} = k_{19} \cdot R_{(m+1)n} + k_{20} \cdot G_{m(n+1)} + k_{21} \cdot B_{mn} \quad (10)$$

For example, low-band luminance signals $Y_{L11}$, $Y_{L31}$ and $Y_{L23}$ from picture elements corresponding to the filters $B_{11}$, $B_{31}$ and $B_{23}$ as shown in FIG. 3 are calculated by the equation (10) as follows.

$Y_{L11} = k_{19} \cdot R_{21} + k_{20} \cdot G_{12} + k_{21} \cdot B_{11}$, $Y_{L31} = k_{19} \cdot R_{41} + k_{20} \cdot G_{32} + k_{21} \cdot B_{31}$, and $Y_{L23} = k_{19} \cdot R_{33} + k_{20} \cdot G_{24} + k_{21} \cdot B_{23}$.

All low-band luminance signals in intersections of other G/B rows and B columns are formed in the same manner as described above.

It is apparent from the aforementioned equations (7) through (10) that when a low-band luminance signal is formed based on chrominance signals pertaining to three picture elements horizontally, vertically and diagonally adjacent to one another as described above, the reproducibility of the low-band luminance signal in the vertical direction can be improved, to thereby attain an improvement in resolution.

A theory of formation of color difference signals $R-Y$ and $B-Y$ based on chrominance signals pertaining to three picture elements adjacent to one another will be described hereunder.

In FIG. 3, color difference signals $R-Y_{mn}$ corresponding to picture elements G in a portion where a filter G is followed by an adjacent filter R are calculated by the equation (11).

$$R - Y_{mn} = k_{22} \cdot R_{m(n+1)} - k_{23} \cdot G_{mn} - k_{24} \cdot B_{(m+1)(n+1)} \quad (11)$$

For example, color difference signals $R-Y_{20}$, $R-Y_{12}$ and $R-Y_{32}$ in picture elements corresponding to the filters $G_{20}$, $G_{12}$ and $G_{32}$ as shown in FIG. 3 are calculated by the equation (11) as follows.

$R - Y_{20} = k_{22} \cdot R_{21} - k_{23} \cdot G_{20} - k_{24} \cdot B_{31}$, $R - Y_{12} = k_{22} \cdot R_{13} - k_{23} \cdot G_{12} - k_{24} \cdot B_{23}$, and $R - Y_{32} = k_{22} \cdot R_{33} - k_{23} \cdot G_{32} - k_{24} \cdot B_{43}$.

All color difference signals in intersections of other G/R rows and G columns are calculated in the same manner as described above.

In FIG. 3, color difference signals $R-Y_{mn}$ corresponding to picture elements R in a portion where filters G and R are adjacent to each other are calculated by the equation (12).

$$R - Y_{mn} = k_{25} \cdot R_{mn} - k_{26} \cdot G_{m(n+1)} - k_{27} \cdot B_{(m+1)n} \quad (12)$$

For example, color difference signals $R-Y_{21}$, $R-Y_{13}$ and $R-Y_{33}$ in picture elements corresponding to the filters $R_{21}$, $R_{13}$ and $R_{33}$ as shown in FIG. 3 are calculated by the equation (12) as follows.

$R - Y_{21} = k_{25} \cdot R_{21} - k_{26} \cdot G_{22} - k_{27} \cdot B_{31}$, $R - Y_{13} = k_{25} \cdot R_{13} - k_{26} \cdot G_{14} - k_{27} \cdot B_{23}$, and $R - Y_{33} = k_{25} \cdot R_{33} - k_{26} \cdot G_{34} - k_{27} \cdot B_{43}$.

All color difference signals corresponding to R picture elements in a portion where other G and R filters are adjacent to each other are formed in the same manner as described above.

In FIG. 3, color difference signals $R-Y_{mn}$ corresponding to picture elements G in a portion where a filter G is followed by an adjacent filter B are calculated by the equation (13).

$$R - Y_{mn} = k_{28} \cdot R_{(m+1)(n+1)} - k_{29} \cdot G_{mn} + k_{30} \cdot B_{m(n+1)} \quad (13)$$

For example, color difference signals $R-Y_{10}$, $R-Y_{30}$ and $R-Y_{22}$ in picture elements corresponding to the filters $G_{10}$, $G_{30}$ and $G_{22}$ as shown in FIG. 3 are calculated by the equation (13) as follows.

$R - Y_{10} = k_{28} \cdot R_{21} - k_{29} \cdot G_{10} - k_{30} \cdot B_{11}$, $R - Y_{30} = k_{28} \cdot R_{41} - k_{29} \cdot G_{30} - k_{30} \cdot B_{31}$, and $R - Y_{22} = k_{28} \cdot R_{33} - k_{29} \cdot G_{22} - k_{30} \cdot B_{23}$.

All corresponding color difference signals $R-Y_{mn}$ are formed in the same manner as described above.

In FIG. 3, color difference signals $R-Y_{mn}$ corresponding to picture elements B in a portion where filters G and B are adjacent to each other are calculated by the equation (14).

$$R - Y_{mn} = k_{31} \cdot R_{(m+1)n} - k_{32} \cdot G_{m(n+1)} - k_{33} \cdot B_{mn} \quad (14)$$

For example, color difference signals $R-Y_{11}$, $R-Y_{31}$ and $R-Y_{23}$ in picture elements corresponding to the filters $B_{11}$, $B_{31}$ and $B_{23}$ as shown in FIG. 3 are calculated by the equation (14) as follows.

$R - Y_{11} = k_{31} \cdot R_{21} - k_{32} \cdot G_{12} - k_{33} \cdot B_{11}$, $R - Y_{31} = k_{31} \cdot R_{41} - k_{32} \cdot G_{32} - k_{33} \cdot B_{31}$, and $R - Y_{23} = k_{31} \cdot R_{33} - k_{32} \cdot G_{24} - k_{33} \cdot B_{23}$.

All color difference signals $R-Y_{mn}$ are formed in the same manner as described above.

In the following, a theory of formation of color difference signals $B-Y$ is described.

In FIG. 3, color difference signals $B-Y_{mn}$ corresponding to picture elements G in a portion where a filter G is followed by an adjacent filter R are calculated by the equation (15).

$$B - Y_{mn} = -k_{34} \cdot R_{m(n+1)} - k_{35} \cdot G_{mn} + k_{36} \cdot B_{(m+1)(n+1)} \quad (15)$$

For example, color difference signals $B-Y_{20}$, $B-Y_{12}$ and $B-Y_{32}$ in picture elements corresponding to the filters $G_{20}$, $G_{12}$ and $G_{32}$ as shown in FIG. 3 are calculated by the equation (15) as follows.

$$B-Y_{20} = -k_{34} \cdot R_{21} - k_{35} \cdot G_{20} + k_{36} \cdot B_{31},$$

$$B-Y_{12} = -k_{34} \cdot R_{13} - k_{35} \cdot G_{12} + k_{36} \cdot B_{23}, \text{ and}$$

$$B-Y_{32} = -k_{34} \cdot R_{33} - k_{35} \cdot G_{32} + k_{36} \cdot B_{43}.$$

All color difference signals $B-Y_{mn}$ in intersections of other G/R rows and G columns are calculated in the same manner as described above.

In FIG. 3, color difference signals $B-Y_{mn}$ corresponding to picture elements R in a portion where filters G and R are adjacent to each other are calculated by the equation (16).

$$B-Y_{mn} = -k_{37} \cdot R_{mn} - k_{38} \cdot G_{m(n+1)} + k_{39} \cdot B_{(m+1)n} \quad (16)$$

For example, color difference signals $B-Y_{21}$, $B-Y_{13}$ and $B-Y_{33}$ in picture elements corresponding to the filters $R_{21}$, $R_{13}$ and $R_{33}$ as shown in FIG. 3 are calculated by the equation (16) as follows.

$$B-Y_{21} = -k_{37} \cdot R_{21} - k_{38} \cdot G_{22} + k_{39} \cdot B_{31},$$

$$B-Y_{13} = -k_{37} \cdot R_{13} - k_{38} \cdot G_{14} + k_{39} \cdot B_{23}, \text{ and}$$

$$B-Y_{33} = -k_{37} \cdot R_{33} - k_{38} \cdot G_{34} + k_{39} \cdot B_{43}.$$

All low-band luminance signals in intersections of other G/R rows and R columns are formed in the same manner as described above.

In FIG. 3, color difference signals $B-Y_{mn}$ corresponding to picture elements G in a portion where a filter G is followed by an adjacent to filter B are calculated by the equation (17).

$$B-Y_{mn} = -k_{40} \cdot R_{(m+1)(n+1)} - k_{41} \cdot G_{mn} + k_{42} \cdot B_{m(n+1)} \quad (17)$$

For example, color difference signals $B-Y_{10}$, $B-Y_{30}$ and $B-Y_{22}$ in picture elements corresponding to the filters $G_{10}$, $G_{30}$ and $G_{22}$ as shown in FIG. 3 are calculated by the equation (17) as follows.

$$B-Y_{10} = -k_{40} \cdot R_{21} - k_{41} \cdot G_{10} + k_{42} \cdot B_{11},$$

$$B-Y_{30} = -k_{40} \cdot R_{41} - k_{41} \cdot G_{30} + k_{42} \cdot k_{42} \cdot B_{31}, \text{ and}$$

$$B-Y_{22} = -k_{40} \cdot R_{33} - k_{41} \cdot G_{22} + k_{42} \cdot B_{23}.$$

All color difference signals $R-Y_{mn}$ in intersections of other G/B rows and G columns are formed in the same manner as described above.

In FIG. 3, color difference signals $B-Y_{mn}$ corresponding to picture elements B in a portion where filters G and B are adjacent to each other are calculated by the equation (18).

$$B-Y_{mn} = -k_{43} \cdot R_{(m+1)n} - k_{44} \cdot G_{m(n+1)} + k_{45} \cdot B_{mn} \quad (18)$$

For example, color difference signals $B-Y_{11}$, $B-Y_{31}$ and $B-Y_{23}$ in picture elements corresponding to the filters $B_{11}$, $B_{31}$ and $B_{23}$ as shown in FIG. 3 are calculated by the equation (18) as follows.

$$B-Y_{11} = -k_{43} \cdot R_{21} - k_{44} \cdot G_{12} + k_{45} \cdot B_{11},$$

$$B-Y_{31} = -k_{43} \cdot R_{41} - k_{44} \cdot G_{32} + k_{45} \cdot B_{31}, \text{ and}$$

$$B-Y_{23} = -k_{43} \cdot R_{33} - k_{44} \cdot G_{24} + k_{45} \cdot B_{23}.$$

All color difference signals in intersections of other G/B rows and B columns are formed in the same manner as described above.

When color difference signals $R-Y$ and $B-Y$ are formed based on chrominance signals pertaining to picture elements horizontally, vertically and diagonally adjacent to one another as described above, color difference signals can be reproduced to reduce the occurrence of spurious colors.

According to the equations (7) through (10), a low-band luminance signal can be formed based on chrominance signals generated from three picture elements adjacent to one another. A theory of formation of an improved low-band luminance signal, which results in reduction of decolorization without lowering of horizontal resolution to thereby prevent occurrence of spurious colors will be described hereunder with reference to the following equations (19) through (22). This method for forming a low-band luminance signal is based on four chrominance signals pertaining to picture elements adjacent to one another.

In FIG. 3, low-band luminance signals $Y_{Lmn}$ corresponding to picture elements G in a portion where a filter G is followed by an adjacent filter R are calculated by the equation (19).

$$Y_{Lmn} = k_{46} \cdot R_{m(n+1)} + k_{47} \cdot (G_{mn} + G_{(m+1)n}) + k_{48} \cdot B_{(m+1)(n+1)} \quad (19)$$

For example, low-band luminance signals $Y_{L20}$, $Y_{L12}$ and $Y_{L32}$ in picture elements corresponding to the filters $G_{20}$, $G_{12}$ and $G_{32}$ as shown in FIG. 3 are calculated by the equation (19) as follows.

$$Y_{L20} = k_{46} \cdot R_{21} + k_{47} \cdot (G_{20} + G_{30}) + k_{48} \cdot B_{31},$$

$$Y_{L12} = k_{46} \cdot R_{13} + k_{47} \cdot (G_{12} + G_{22}) + k_{48} \cdot B_{23}, \text{ and}$$

$$Y_{L32} = k_{46} \cdot R_{33} + k_{47} \cdot (G_{32} + G_{42}) + k_{48} \cdot B_{43}.$$

All low-band luminance signals in intersections of other G/R rows and G columns are formed in the same manner as described above.

In FIG. 3, low-band luminance signals $Y_{Lmn}$ corresponding to picture elements R in a portion where filters G and R are adjacent to each other are calculated by the equation (20).

$$Y_{Lmn} = k_{49} \cdot R_{mn} + k_{50} \cdot (G_{m(n-1)} + G_{(m+1)(n+1)}) + k_{51} \cdot B_{(m+1)n} \quad (20)$$

For example, low-band luminance signals $Y_{L21}$, $Y_{L13}$ and $Y_{L33}$ in picture elements corresponding to the filters $R_{21}$, $R_{13}$ and $R_{33}$ as shown in FIG. 3 are calculated by the equation (20) as follows.

$$Y_{L21} = k_{49} \cdot R_{21} + k_{50} \cdot (G_{22} + G_{32}) + k_{51} \cdot B_{31},$$

$$Y_{L13} = k_{49} \cdot R_{13} + k_{50} \cdot (G_{14} + G_{24}) + k_{51} \cdot B_{23}, \text{ and}$$

$$Y_{L33} = k_{49} \cdot R_{33} + k_{50} \cdot (G_{34} + G_{44}) + k_{51} \cdot B_{43}.$$

All low-band luminance signals in intersections of other G/R rows and R columns are formed in the same manner as described above.

In FIG. 3, low-band luminance signals $Y_{Lmn}$ corresponding to picture elements G in a portion where a filter G is followed by an adjacent B filter are calculated by the equation (21).

$$Y_{Lmn} = k_{52} \cdot R_{(m+1)(n+1)} + k_{53} \cdot (G_{mn} + G_{(m+1)n}) + k_{54} \cdot B_{m(n+1)} \quad (21)$$

For example, low-band luminance signals $Y_{L10}$, $Y_{L30}$ and $Y_{L22}$ in picture elements corresponding to the filters $G_{10}$, $G_{30}$ and $G_{22}$ as shown in FIG. 3 are calculated by the equation (21) as follows.

$$L_{L10} = k_{52} \cdot R_{21} + k_{53} \cdot (G_{10} + G_{20}) + K_{54} \cdot B_{11},$$

$$Y_{L30} = k_{52} \cdot R_{41} + k_{53} \cdot (G_{30} + G_{40}) + K_{54} \cdot B_{31}, \text{ and}$$

$$Y_{L22} = k_{52} \cdot R_{33} + k_{53} \cdot (G_{22} + G_{32}) + k_{54} \cdot B_{23}.$$

All low-band luminance signals in intersections of other G/B rows and G columns are formed in the same manner as described above.

In FIG. 3, low-band luminance signals $Y_{Lmn}$ corresponding to picture elements B in a portion where filters G and B are adjacent to each other are calculated by the equation (22).

$$Y_{Lmn} = k_{55} \cdot R_{(m+1)n} + k_{56} \cdot (G_{m(n+1)} + G_{(m+1)(n+1)}) + k_{57} \cdot B_{mn} \quad (22)$$

For example, low-band luminance signals $Y_{L11}$, $Y_{L31}$ and $Y_{L23}$ in picture elements corresponding to the filters $B_{11}$, $B_{31}$ and $B_{23}$ as shown in FIG. 3 are calculated by the equation (22) as follows.

$$Y_{L11} = k_{55} \cdot R_{21} + k_{56} \cdot (G_{12} + G_{22}) + k_{57} \cdot B_{11},$$

$$Y_{L31} = k_{55} \cdot R_{41} + k_{56} \cdot (G_{32} + G_{42}) + k_{57} \cdot B_{31}, \text{ and}$$

$$Y_{L23} = k_{55} \cdot R_{33} + k_{56} \cdot (G_{24} + G_{34}) + k_{57} \cdot B_{23}.$$

All low-band luminance signals in intersections of other G/B rows and B columns are formed in the same manner as described above.

When a low-band luminance signal is formed based on chrominance signals pertaining to four picture elements adjacent to one another as described above, the reproducibility of the low-band luminance signal in the vertical direction can be improved compared with the case where the signal is formed based on chrominance signals pertaining to three adjacent picture elements in order to thereby attain an improvement in resolution.

A theory of formation of a color difference signal R−Y based on chrominance signals pertaining to four picture elements adjacent to one another will be described hereunder.

In FIG. 3, color difference signals $R - Y_{mn}$ corresponding to picture elements G in a portion where a filter G is followed by an adjacent filter R are calculated by the equation (23).

$$R - Y_{mn} = k_{58} \cdot R_{m(n+1)} - k_{59} \cdot (G_{mn} + G_{(m+1)n}) - k_{60} \cdot B_{(m+1)(n+1)} \quad (23)$$

For example, color difference signals $R - Y_{20}$, $R - Y_{12}$ and $R - Y_{32}$ in picture elements corresponding to the filters $G_{20}$, $G_{12}$ and $G_{32}$ as shown in FIG. 3 are calculated by the equation (23) as follows.

$$R - Y_{20} = k_{58} \cdot R_{21} - k_{59} \cdot (G_{20} + G_{30}) - k_{60} \cdot B_{31},$$

$$R - Y_{12} = k_{58} \cdot R_{13} - k_{59} \cdot (G_{12} + G_{22}) - k_{60} \cdot B_{23}, \text{ and}$$

$$R - Y_{32} = k_{58} \cdot R_{33} - k_{59} \cdot (G_{32} + G_{42}) - k_{60} \cdot B_{43}.$$

All color difference signals in intersections of other G/R rows and G columns are calculated in the same manner as described above.

In FIG. 3, color difference signals $R - Y_{mn}$ corresponding to picture elements R in a portion where filters G and R are adjacent to each other are calculated by the equation (24).

$$R - Y_{mn} = k_{61} \cdot R_{mn} - k_{62} \cdot (G_{m(n+1)} + G_{(m+1)(n+1)}) - k_{63} \cdot B_{(m+1)n} \quad (24)$$

For example, color difference signals $R - Y_{21}$, $R - Y_{13}$ and $R - Y_{33}$ in picture elements corresponding to the filters $R_{21}$, $R_{13}$ and $R_{33}$ as shown in FIG. 3 are calculated by the equation (24) as follows.

$$R - Y_{21} = k_{61} \cdot R_{21} - k_{62} \cdot (G_{22} + G_{32}) - k_{63} \cdot B_{31},$$

$$R - Y_{13} = k_{61} \cdot R_{13} - k_{62} \cdot (G_{14} + G_{24}) - k_{63} \cdot B_{23}, \text{ and}$$

$$R - Y_{33} = k_{61} \cdot R_{33} - k_{62} \cdot (G_{34} + G_{44}) - k_{63} \cdot B_{43}.$$

All color difference signals corresponding to picture elements R in a portion where other G and R filters are adjacent to each other are formed in the same manner as described above.

In FIG. 3, color difference signals $R - Y_{mn}$ corresponding to picture elements G in a portion where a filter G is followed by an adjacent filter B are calculated by the equation (25).

$$R - Y_{mn} = k_{64} \cdot R_{(m+1)(n+1)} - k_{65} \cdot (G_{mn} + G_{(m+1)n}) - k_{66} \cdot B_{m(n+1)} \quad (25)$$

For example, color difference signals $R - Y_{10}$, $R - Y_{30}$ and $R - Y_{22}$ in picture elements corresponding to the filters $G_{10}$, $G_{30}$ and $G_{22}$ as shown in FIG. 3 are calculated by the equation (25) as follows.

$$R - Y_{10} = k_{64} \cdot R_{21} - k_{65} \cdot (G_{10} + G_{20}) - k_{66} \cdot B_{11},$$

$$R - Y_{30} = k_{64} \cdot R_{41} - k_{65} \cdot (G_{30} + G_{40}) - k_{66} \cdot B_{31}, \text{ and}$$

$$R - Y_{22} = k_{64} \cdot R_{33} - k_{65} \cdot (G_{22} + G_{32}) - k_{66} \cdot B_{23}.$$

Other corresponding color difference signals $R - Y_{mn}$ are formed in the same manner as described above.

In FIG. 3, color difference signals $R - Y_{mn}$ corresponding to picture elements B in a portion where filters G and B are adjacent to each other are calculated by the equation (26).

$$R - Y_{mn} = k_{67} \cdot R_{(m+1)n} - k_{68} \cdot (G_{m(n+1)} + G_{(m+1)(n+1)}) - k_{69} \cdot B_{mn} \quad (26)$$

For example, color difference signals $R - Y_{11}$, $R - Y_{31}$ and $R - Y_{23}$ in picture elements corresponding to the filters $B_{11}$, $B_{31}$ and $B_{23}$ as shown in FIG. 3 are calculated by the equation (26) as follows.

$R-Y_{11} = k_{67} \cdot R_{21} - k_{68} \cdot (G_{12} + G_{22}) - k_{69} \cdot B_{11},$ $R-Y_{31} = k_{67} \cdot R_{41} - k_{68} \cdot (G_{32} + G_{42}) - k_{69} \cdot B_{31},$ and $R-Y_{23} = k_{67} \cdot R_{33} - k_{68} \cdot (G_{24} + G_{34}) - k_{69} \cdot B_{23}.$ Other color difference signals $R-Y_{mn}$ are formed in the same manner as described above.

In the following, a theory of formation of a color difference signal $B-Y$ based on four adjacent chrominance signals is described.

In FIG. 3, color difference signals $B-Y_{mn}$ corresponding to picture elements G in a portion where a filter G is followed by an adjacent filter R are calculated by the equation (27).

$$B-Y_{mn} = -k_{70} \cdot R_{m(n-1)} - k_{71} \cdot (G_{mn} + G_{(m+1)n}) + k_{72} \cdot B_{(m+1)(n-1)} \quad (27)$$

For example, color difference signals $B-Y_{20}$, $B-Y_{12}$ and $B-Y_{32}$ in picture elements corresponding to the filters $G_{20}$, $G_{12}$ and $G_{32}$ as shown in FIG. 3 are calculated by the equation (27) as follows.

$B-Y_{20} = -k_{70} \cdot R_{21} - k_{71} \cdot (G_{20} + G_{30}) + k_{72} \cdot B_{31},$ $B-Y_{12} = -k_{70} \cdot R_{13} - k_{71} \cdot (G_{12} + G_{22}) + k_{72} \cdot B_{23},$ and $B-Y_{32} = -k_{70} \cdot R_{33} - k_{71} \cdot (G_{32} + G_{42}) + k_{72} \cdot B_{43}.$ All color difference signals $B-Y_{mn}$ in intersections of other G/R rows and G columns are calculated in the same manner as described above.

In FIG. 3, color difference signals $B-Y_{mn}$ corresponding to picture elements R in a portion where filters G and R are adjacent to each other are calculated by the equation (28).

$$B-Y_{mn} = -k_{73} \cdot R_{mn} - k_{74} \cdot (G_{m(n-1)} + G_{(m+1)(n-1)}) + k_{75} \cdot B_{(m-1)n} \quad (28)$$

For example, color difference signals $B-Y_{21}$, $B-Y_{13}$ and $B-Y_{33}$ in picture elements corresponding to the filters $R_{21}$, $R_{13}$ and $R_{33}$ as shown in FIG. 3 are calculated by the equation (28) as follows.

$B-Y_{21} = -k_{73} \cdot R_{21} - k_{74} \cdot (G_{22} + G_{32}) + k_{75} \cdot B_{31},$ $B-Y_{13} = -k_{73} \cdot R_{13} - k_{74} \cdot (G_{14} + G_{24}) + k_{75} \cdot B_{23},$ and $B-Y_{33} = -k_{73} \cdot R_{33} - k_{74} \cdot (G_{34} + G_{44}) + k_{75} \cdot B_{43}.$ All color difference signals in intersections of other G/R rows and R columns are formed in the same manner as described above.

In FIG. 3, color difference signals $B-Y_{mn}$ corresponding to picture elements G in a portion where a filter G is followed by an adjacent filter B are calculated by the equation (29).

$$B-Y_{mn} = -k_{76} \cdot R_{(m+1)(n+1)} - k_{77} \cdot (G_{mn} + G_{(m+1)n}) + k_{78} \cdot B_{m(n+1)} \quad (29)$$

For example, color difference signals $B-Y_{10}$, $B-Y_{30}$ and $B-Y_{22}$ in picture elements corresponding to the filters $G_{10}$, $G_{30}$ and $G_{22}$ as shown in FIG. 3 are calculated by the equation (29) as follows.

$B-Y_{10} = -k_{76} \cdot R_{21} - k_{77} \cdot (G_{10} + G_{20}) + k_{78} \cdot B_{11},$ $B-Y_{30} = -k_{76} \cdot R_{41} - k_{77} \cdot (G_{30} + G_{40}) + k_{78} \cdot B_{31},$ and $B-Y_{22} = -k_{76} \cdot R_{33} - k_{77} \cdot (G_{22} + G_{32}) + k_{78} \cdot B_{23}.$ All color difference signals $B-Y_{mn}$ in intersections of other G/B rows and G columns are formed in the same manner as described above.

In FIG. 3, color difference signals $B-Y_{mn}$ corresponding to picture elements B in a portion where filters G and B are adjacent to each other are calculated by the equation (30).

$$B-Y_{mn} = -k_{79} \cdot R_{(m+1)n} - k_{80} \cdot (G_{m(n+1)} + G_{(m+1)(n+1)}) + k_{81} \cdot B_{mn} \quad (30)$$

(For example, color difference signals $B-Y_{11}$, $B-Y_{31}$ and $B-Y_{23}$ in picture elements corresponding to the filters $B_{11}$, $B_{31}$ and $B_{23}$ as shown in FIG. 3 are calculated by the equation (30) as follows.

$B-Y_{11} = -k_{79} \cdot R_{21} - k_{80} \cdot (G_{12} + G_{22}) + k_{81} \cdot B_{11},$ $B-Y_{31} = -k_{79} \cdot R_{41} - k_{80} \cdot (G_{32} + G_{42}) + k_{81} \cdot B_{31},$ and $B-Y_{23} = -k_{79} \cdot R_{33} - k_{80} \cdot (G_{24} + G_{34}) + k_{81} \cdot B_{23}.$ All color difference signals in intersections of other G/B rows and B columns are formed in the same manner as described above.

When color difference signals $B-Y$ are formed based on chrominance signals pertaining to four picture elements horizontally, vertically and diagonally adjacent to one another as described above, color reproducibility can be improved to reduce the occurrence of spurious colors as compared with the case where color difference signals are formed based on chrominance signals pertaining to three picture elements according to the equations (15) through (18).

In the following, a theory of formation of a low-band luminance signal $Y_L$ is described in the case where the arrangement of four chrominance signals in the aforementioned equations (19) through (22) is changed. Although the arithmetic operation represented by the equations (19) through (22) uses two green chrominance signals adjacent to each other, the following arithmetic operation represented by equations chrominance signals adjacent to each other.

In FIG. 3, a low-band luminance signal $Y_{Lmn}$ corresponding to a picture element G in a portion where a filter G is followed by an adjacent filter R is represented by the equation (31):

$$Y_{Lmn} = k_{82} \cdot R_{m(n+1)} + k_{83} \cdot G_{mn} + k_{84} \cdot (B_{(m-1)(n+1)} + B_{(m+1)(n+1)}) \quad (31)$$

in which m and n are natural numbers showing the arrangement of a picture element.

In FIG. 3, a low-band luminance signal $Y_{Lmn}$ corresponding to a picture element R in a portion where filters G and R are adjacent to each other is calculated by the equation (32):

$$Y_{Lmn} = k_{85} \cdot R_{mn} + k_{86} \cdot G_{m(n+1)} + k_{87} \cdot (B_{(m-1)n} + B_{(m+1)n}) \quad (32)$$

in which m and n are natural numbers showing the arrangement of a picture element.

In FIG. 3, a low-band luminance signal $Y_{Lmn}$ corresponding to a picture element G in a portion where a filter G is followed by an adjacent filter B is calculated by the equation (33):

$$Y_{Lmn} = k_{89} \cdot (R_{(m-1)(n+1)} + R_{(m-1)(n+1)}) + k_{90} \cdot G_{mn} + k_{91} \cdot B_{M(n+1)} \tag{33}$$

in which m and n are natural numbers showing the arrangement of a picture element.

In FIG. 3, a low-band luminance signal $Y_{Lmn}$ corresponding to a picture element B in a portion where filters G and B are adjacent to each other is calculated by the equation (34):

$$Y_{Lmn} = k_{91} \cdot (R_{(m-1)n} + R_{(m+1)n}) + k_{92} \cdot G_{m(n+1)} + k_{93} \cdot B_{mn} \tag{34}$$

in which m and n are natural numbers showing the arrangement of a picture element.

When a low-band luminance signal is formed based on four chrominance signals according to the equations (31) through (34) as described above, color reproducibility can be improved to attain improvement in vertical resolution, compared with the case where the low-band luminance signal is formed based on three chrominance signals according to the equations (31) through (34).

Another theory of formation of color difference signals will be described hereunder with reference to the following equations (35) through (42) obtained by improving the equations (23) through (30). In the equations, the subscripts m and n are natural numbers showing the arrangement of a picture element.

In FIG. 3, a color difference signal $R - Y_{mn}$ corresponding to a picture element G in a portion where a filter G is followed by an adjacent filter R is calculated by the equation (35).

$$R - Y_{mn} = k_{94} \cdot R_{m(n-1)} - k_{95} \cdot G_{mn} - k_{96} \cdot (B_{(m-1)(n-1)} + B_{(m+1)(n+1)}) \tag{35}$$

In FIG. 3, a color difference signal $R - Y_{mn}$ corresponding to a picture element R in a portion where filters G and R are adjacent to each other is calculated by the equation (36).

$$R - Y_{mn} = k_{97} \cdot R_{mn} - k_{98} \cdot G_{m(n-1)} - k_{99} \cdot (B_{(m-1)n} + B_{(m+1)n}) \tag{36}$$

In FIG. 3, a color difference signal $R - Y_{mn}$ corresponding to a picture element G in a portion where filters G and B are adjacent to each other is calculated by the equation (37).

$$R - Y_{mn} = k_{100} \cdot (R_{(m-1)(n+1)} + R_{(m+1)(n+1)}) - k_{101} \cdot G_{mn} - k_{102} \cdot B_{m(n+1)} \tag{37}$$

In FIG. 3, a color difference signal $R - Y_{mn}$ corresponding to a picture element B in a portion where filters G and B are adjacent to each other is calculated by the equation (38).

$$R - Y_{mn} = k_{103} \cdot (R_{(m-1)n} + R_{(m+1)n}) - k_{104} \cdot G_{m(n+1)} - K_{105} \cdot B_{mn} \tag{38}$$

In FIG. 3, a color difference signal $B - Y_{mn}$ corresponding to a picture element G in a portion where a filter G is followed by an adjacent filter R is calculated by the equation (39).

$$B - Y_{mn} = -k_{106} \cdot R_{m(n+1)} - k_{107} \cdot G_{mn} + k_{108} \cdot (B_{(m-1)(n+1)} + B_{(m+1)(n+1)}) \tag{39}$$

In FIG. 3, a color difference signal $B - Y_{mn}$ corresponding to a picture element R in a portion where filters G and R are adjacent to each other is calculated by the equation (40).

$$B - Y_{mn} = -k_{109} \cdot R_{mn} - k_{110} \cdot G_{m(n+1)} + k_{111} \cdot (B_{(m-1)n} + B_{(m+1)n}) \tag{40}$$

In FIG. 3, a color difference signal $B - Y_{mn}$ corresponding to a picture element G in a portion where a filter G is followed by an adjacent filter B is calculated by the equation (41).

$$B - Y_{mn} = -k_{112} \cdot (R_{(m-1)(n+1)} + R_{(m+1)(n+1)}) - k_{113} \cdot G_{mn} + k_{114} \cdot B_{m(n+1)} \tag{41}$$

In FIG. 3, a color difference signal $B - Y_{mn}$ corresponding to a picture element B in a portion where filters G and B are adjacent to each other is calculated by the equation (42).

$$B - Y_{mn} = -k_{115} \cdot (R_{(m-1)n} + R_{(m+1)n}) - k_{116} \cdot G_{m(n+1)} + k_{117} \cdot B_{mn} \tag{42}$$

When a color difference signal is formed based on adjacent four chrominance signals according to the equations (35) through (42) as described above, the reproducibility of the color difference signal can be improved to reduce occurrence of spurious colors.

In the following, a theory of formation of a low-band luminance signal $Y_L$ based on six chrominance signals adjacent to on another is described.

In FIG. 3, a low-band luminance signal $Y_{Lmn}$ corresponding to a picture element G in a portion where a filter G is followed by an adjacent filter R is calculated by the equation (43).

$$Y_{Lmn} = k_{118} \cdot R_{m(n+1)} + k_{119} \cdot G_{mn} - k_{120} \cdot (G_{(m-1)n} + G_{(m+1)n}) + k_{121} \cdot (B_{(m-1)(n+1)} + B_{(m+1)(n+1)}) \tag{43}$$

In short, low-band luminance signals $Y_{Lmn}$ in picture elements corresponding to filters $G_{00}$, $G_{04}$, $G_{12}$, $G_{16}$, $G_{20}$, $G_{24}$, $G_{32}$, $G_{36}$, $G_{40}$, $G_{44}$, $G_{52}$, $G_{56}$, $G_{60}$, $G_{64}$, $G_{72}$, $G_{76}$, $G_{80}$, $G_{84}$, etc., in FIG. 3 are calculated according to the equation (43). For example, low-band luminance signals $Y_{L20}$, $Y_{L12}$ and $Y_{L32}$ in picture elements corresponding to the filters $G_{20}$, $G_{12}$ and $G_{32}$ as shown in FIG. 7 are calculated by the equation (43) as follows.

$$Y_{L20} = k_{118} \cdot R_{21} + k_{119} \cdot G_{20} - k_{120} \cdot (G_{10} + G_{30}) + k_{121} \cdot (B_{11} + B_{31}),$$

$$Y_{L12} = K_{118} \cdot R_{13} + k_{119} \cdot G_{12} - k_{120} \cdot (G_{02} G_{22}) + K_{121} \cdot (B_{03} + B_{23}), \text{ and}$$

$$Y_{L32} = k_{118} \cdot R_{33} + k_{119} \cdot G_{32} - k_{120} \cdot (G_{22} + G_{42}) + k_{121} \cdot (B_{23} + B_{43}).$$

All low-band luminance signals in intersections of other G/R rows and G columns are formed in the same manner as described above. According to the equation (43), the respective low-band luminance signal is formed based on six chrominance signals with a G/R-row G-column green chrominance signal $G_{mn}$ as the center thereof, that is, $G_{mn}$, $R_{m(n+1)}$, $G_{(m-1)n}$, $G_{(m+1)n}$, $B_{(m-1)(n+1)}$ and $B_{(m+1)(n+1)}$.

In FIG. 3, a low-band luminance signal $Y_{Lmn}$ corresponding to a picture element R in a portion where filters G and R are adjacent to each other is calculated by the equation (44).

$$Y_{Lmn} = k_{122} \cdot R_{mn} + k_{123} \cdot G_{m(n-1)} - k_{124} \cdot (G_{(m-1)(n-1)} + G_{(m+1)(n+1)}) + k_{125} \cdot (B_{(m-1)n} + B_{(m+1)n}) \quad (44)$$

In short, low-band luminance signals $Y_{Lmn}$ in picture elements corresponding to filters $R_{01}$, $R_{05}$, $R_{13}$, $R_{17}$, $R_{21}$, $R_{25}$, $R_{33}$, $R_{37}$, $R_{41}$, $R_{45}$, $R_{53}$, $R_{57}$, $R_{61}$, $R_{65}$, $R_{73}$, $R_{77}$, $R_{81}$, $R_{85}$, etc., in FIG. 3 are calculated according to the equation (44). For example, low-band luminance signals $Y_{L21}$, $Y_{L13}$ and $Y_{L33}$ in picture elements corresponding to the filters $R_{21}$, $R_{13}$ and $R_{33}$ as shown in FIG. 8 are calculated by the equation (44) as follows.

$$Y_{L21} = k_{123} \cdot R_{21} + k_{124} \cdot G_{22} - k_{125} \cdot (G_{12} + G_{32}) + k_{126} \cdot (B_{11} + B_{31}),$$

$$Y_{L13} = k_{123} \cdot R_{13} + k_{124} \cdot G_{14} - k_{125} \cdot (G_{04} + G_{24}) + k_{126} \cdot (B_{03} + B_{23}), \text{ and}$$

$$Y_{L33} = k_{123} \cdot R_{33} + k_{124} \cdot G_{34} - k_{125} \cdot (G_{24} + G_{44}) + K_{126} \cdot (B_{23} + B_{43}).$$

All low-band luminance signals in intersections of other G/R rows and G columns are formed in the same manner as described above. According to the equation (44), the respective low-band luminance signal is formed based on six chrominance signals with a G/R-row R-column red chrominance signal $R_{mn}$ as the center thereof, that is, $R_{mn}$, $G_{m(n+1)}$, $G_{(m-1)(n+1)}$, $G_{(m+1)(n+1)}$, $B_{(m-1)n}$, and $B_{(m+1)n}$.

In FIG. 3, a low-band luminance signal $Y_{Lmn}$ corresponding to a picture element G in a portion where a filter G is followed by an adjacent filter B is calculated by the equation (45).

$$Y_{Lmn} = k_{126} \cdot (R_{(m-1)(n+1)} + R_{(m+1)(n+1)}) + k_{127} \cdot G_{mn} - k_{128} \cdot (G_{(m-1)n} + G_{(m+1)n}) + k_{129} \cdot B_{m(n+1)} \quad (45)$$

In short, low-band luminance signals $Y_{Lmn}$ in picture elements corresponding to filters $G_{02}$, $G_{06}$, $G_{10}$, $G_{14}$, $G_{22}$, $G_{26}$, $G_{30}$, $G_{34}$, $G_{42}$, $G_{46}$, $G_{50}$, $LG_{54}$, $G_{62}$, $G_{66}$, $LG_{70}$, $G_{74}$, $G_{82}$, $G_{86}$, etc., in FIG. 3 are calculated according to the equation (45). For example, low-band luminance signals $Y_{L10}$, $Y_{L30}$ and $Y_{L22}$ in picture elements corresponding to the filters $G_{10}$, $G_{30}$ and $G_{22}$ as shown in FIG. 9 are calculated by the equation (45) as follows.

$$Y_{L10} = k_{126} \cdot (R_{01} + R_{21}) + k_{127} \cdot G_{10} - k_{128} \cdot (G_{00} + G_{20}) + k_{129} \cdot B_{11},$$

$$Y_{L30} = k_{126} \cdot (R_{21} + R_{41}) + k_{127} \cdot G_{30} - k_{128} \cdot (G_{20} + G_{40}) + k_{129} \cdot B_{31}, \text{ and}$$

$$Y_{L22} = k_{126} \cdot (R_{13} + R_{33}) + k_{127} \cdot G_{22} - k_{128} \cdot (G_{12} + G_{32}) + k_{129} \cdot B_{23}.$$

All low-band luminance signals in intersections of other G/B rows and G columns are formed in the same manner as described above. According to the equation (45), the respective low-band luminance signal is formed based on six chrominance signals with a G/B-row G-column green chrominance signal $G_{mn}$ as the center thereof, that is, $G_{mn}$, $R_{(m-1)(n+1)}$, $R_{(m+1)(n+1)}$, $G_{(m-1)n}$, $G_{(m+1)n}$ and $B_{m(n+1)}$.

In FIG. 3, a low-band luminance signal $Y_{Lmn}$ corresponding to a picture element B in a portion where filters G and B are adjacent to each other is calculated by the equation (46).

$$Y_{Lmn} = k_{130} \cdot (R_{(m-1)n} + R_{(m+1)n}) + k_{131} \cdot G_{m(n-1)} - k_{132} \cdot (G_{(m-1)n} + G_{(m+1)n}) + k_{133} \cdot B_{mn} \quad (46)$$

In short, low-band luminance signals $Y_{Lmn}$ in picture elements corresponding to filters $B_{03}$, $B_{07}$, $B_{11}$, $B_{15}$, $B_{23}$, $B_{27}$, $B_{31}$, $B_{35}$, $B_{43}$, $B_{47}$, $B_{51}$, $B_{55}$, $B_{63}$, $B_{67}$, $B_{71}$, $B_{75}$, $B_{83}$, $B_{87}$, etc., in FIG. 3 are calculated according to the equation (46). For example, low-band luminance signals $Y_{L11}$, $Y_{L31}$ and $Y_{L23}$ in picture elements corresponding to the filters $B_{11}$, $B_{31}$ and $B_{23}$ as shown in FIG. 10 are calculated by the equation (46) as follows.

$$Y_{L11} = k_{130} \cdot (R_{01} + R_{21}) + k_{131} \cdot G_{12} - k_{132} \cdot (G_{02} + G_{22}) + k_{133} \cdot B_{11},$$

$$Y_{L31} = k_{130} \cdot (R_{21} + R_{41}) + k_{131} \cdot G_{32} - k_{132} \cdot (G_{22} + G_{42}) + k_{133} \cdot B_{31}, \text{ and}$$

$$Y_{L23} = k_{130} \cdot (R_{13} + R_{33}) + k_{131} \cdot G_{24} - k_{132} \cdot (G_{14} + G_{34}) + k_{133} \cdot B_{23}.$$

All low-band luminance signals in intersections of other G/B rows and B columns are formed in the same manner as described above. According to the equation (46), the respective low-band luminance signal is formed based on six chrominance signals with a G/B-row B-column blue chrominance signal $B_{mn}$ as the center thereof, that is, $B_{mn}$, $R_{(m-1)n}$, $R_{(m+1)n}$, $G_{(m-1)(n+1)}$, $G_{(m+1)(n+1)}$ and $B_{m(n+1)}$.

When the arithmetic operation represented by the aforementioned equations (43) through (46) is made based on six chrominance signals horizontally, vertically and diagonally adjacent to one another, reproducibility can be improved more to attain improvement in vertical resolution, compared with the case where the low-band luminance signal is formed based on three or four chrominance signals.

A theory of formation of color difference signals $R-Y$ and $B-Y$ based on six chrominance signals adjacent to one another will be described hereunder with reference to the following equations (47) through (54).

In FIG. 3, a color difference signal $R-Y_{mn}$ corresponding to a picture element G in a portion where a filter G is followed by an adjacent filter R is calculated by the equation (47).

$$R - Y_{mn} = k_{134} \cdot R_{m(n+1)} - k_{135} \cdot G_{mn} + k_{136} \cdot (G_{(m-1)n} + G_{(m+1)n}) - k_{137} \cdot (B_{(m-1)(n+1)} + B_{(m+1)(n+1)}) \quad (47)$$

In short, color difference signals in picture elements corresponding to filters $G_{00}$, $G_{04}$, $G_{12}$, $G_{16}$, $G_{20}$, $G_{24}$, $G_{32}$, $G_{36}$, $G_{40}$, $G_{44}$, $G_{52}$, $G_{56}$, $G_{60}$, $G_{64}$, $G_{72}$, $G_{76}$, $G_{80}$, $G_{84}$, etc., in FIG. 3 are calculated according to the equation (47). For example, color difference signals $R-Y_{20}$, $R-Y_{12}$ and $R-Y_{32}$ in picture elements corresponding to the filters $G_{20}$, $G_{12}$ and $G_{32}$ are calculated by the equation (47) as follows.

$$R - Y_{20} = k_{134} \cdot R_{21} - k_{135} \cdot G_{20} + k_{136} \cdot (G_{10} + G_{30}) - K_{137} \cdot (B_{11} + B_{31}),$$

$$R - Y_{12} = k_{134} \cdot R_{13} - k_{135} \cdot G_{12} + k_{136} \cdot (G_{02} + G_{22}) - k_{137} \cdot (B_{03} + B_{23}), \text{ and}$$

$R-Y_{32}=k_{134}\cdot R_{33}-k_{135}\cdot G_{32}+k_{136}\cdot(G_{22}+G_{42})-k_{137}\cdot(B_{23}+B_{43}).$ All color difference signals in intersections of other G/R rows and G columns are formed in the same manner as described above. According to the equation (47), the respective color difference signal is formed based on six chrominance signals with a G/R-row G-column green chrominance signal $G_{mn}$ as the center thereof, that is, $G_{mn}$, $R_{m(n+1)}$, $G_{(m-1)n}$, $G_{(m+1)n}$, $B_{(m-1)(n+1)}$ and $B_{(m+1)(n+1)}$.

In FIG. 3, a color difference signal $R-Y_{mn}$ corresponding to a picture element R in a portion where filters G and R are adjacent to each other is calculated by the equation (48).

$$R - Y_{mn} = k_{138}\cdot R_{mn} - k_{139}\cdot G_{m(n+1)} + k_{140}\cdot (G_{(m-1)(n-1)} + G_{(m+1)(n+1)}) - k_{141}\cdot(B_{(m-1)n} + B_{(m+1)n}) \quad (48)$$

In short, color difference signals $R-Y_{mn}$ in picture elements corresponding to filters $R_{01}$, $R_{05}$, $R_{13}$, $R_{17}$, $R_{21}$, $R_{25}$, $R_{33}$, $R_{37}$, $R_{41}$, $R_{45}$, $R_{53}$, $R_{57}$, $R_{61}$, $R_{65}$, $LR_{73}$, $R_{77}$, $R_{81}$, $R_{85}$, etc., in FIG. 3 are calculated according to the equation (48). For example, color difference signals $R-Y_{21}$, $R-Y_{13}$ and $R-Y_{33}$ in picture elements corresponding to the filters $R_{21}$, $R_{13}$ and $R_{33}$ as shown in FIG. 8 are calculated by the equation (48) as follows.

$R-Y_{21}=k_{138}\cdot R_{21}-k_{139}\cdot G_{22}+k_{140}\cdot(G_{12}+G_{32})-k_{141}\cdot(B_{11}+B_{31}).$ $R-Y_{13}=k_{138}\cdot R_{13}-k_{139}\cdot G_{14}+k_{140}\cdot(G_{04}+G_{24})-k_{141}\cdot(B_{03}+B_{23}),$ and $R-Y_{33}=k_{138}\cdot R_{33}-k_{139}\cdot G_{34}+k_{140}\cdot(G_{24}+G_{44})-k_{141}\cdot(B_{23}+B_{43}).$ All color difference signals in intersections of other G/R rows and G columns are formed in the same manner as described above. According to the equation (48), the respective color difference signal is formed based on six chrominance signals with a G/R-row R-column red chrominance signal $R_{mn}$ as the center thereof, that is, $R_{mn}$, $G_{m(n+1)}$, $G_{(m-1)(n+1)}$, $G_{(m+1)(n+1)}$, $B_{(m-1)n}$, and $B_{(m+1)n}$.

In FIG. 3, a color difference signal $R-Y_{mn}$ corresponding to a picture element G in a portion where a filter G is followed by an adjacent filter B is calculated by the equation (49).

$$R - Y_{mn} = k_{142}\cdot(R_{(m-1)(n+1)} + R_{(m+1)(n+1)}) + k_{143}\cdot G_{mn} - k_{144}\cdot(G_{(m-1)n} + G_{(m+1)n}) - k_{145}\cdot B_{m(n+1)} \quad (49)$$

In short, color difference signals $R-Y_{mn}$ in picture elements corresponding to filters $G_{02}$, $G_{06}$, $G_{06}$, $G_{10}$, $G_{14}$, $G_{22}$, $G_{26}$, $G_{30}$, $G_{34}$, $G_{42}$, $G_{46}$, $G_{50}$, $G_{54}$, $G_{62}$, $G_{66}$, $G_{70}$, $G_{74}$, $G_{82}$, $G_{86}$, etc., in FIG. 3 are calculated according to the equation (49). For example, color difference signals $R-Y_{10}$, $R-Y_{30}$ and $R-Y_{22}$ in picture elements corresponding to the filters $G_{10}$, $G_{30}$ and $G_{22}$ as shown in FIG. 9 are calculated by the equation (49) as follows.

$R-Y_{10}=k_{142}\cdot(R_{01}+R_{21})+k_{143}\cdot G_{10}-k_{144}\cdot(G_{00}+G_{20})-k_{145}\cdot B_{11},$ $R-Y_{30}=k_{142}\cdot(R_{21}+R_{41})+k_{143}\cdot G_{30}-k_{144}\cdot(G_{20}+G_{40})-k_{145}\cdot B_{31},$ and $R-Y_{22}=k_{142}\cdot(R_{13}+R_{33})+k_{143}\cdot G_{22}-k_{144}\cdot(G_{12}+G_{32})-k_{145}\cdot B_{23}.$ All color difference signals $R-Y_{mn}$ in intersections of other G/B rows and G columns are formed in the same manner as described above. According to the equation (49), the respective color difference signal is formed based on six chrominance signals with a G/B-row G-column green chrominance signal $G_{mn}$ as the center thereof, that is, $G_{mn}$, $R_{(m-1)(n+1)}$, $R_{(m+1)(n+1)}$, $G_{(m-1)n}$, $G_{(m+1)n}$ and $B_{m(n+1)}$.

In FIG. 3, a color difference signal $R-Y_{mn}$ corresponding to a picture element B in a portion where filters G and B are adjacent to each other is calculated by the equation (50).

$$R-Y_{mn}=k_{146}\cdot(R_{(m-1)n}+R_{(m+1)n})+k_{147}\cdot G_{m(n+1)}-k_{148}\cdot(G_{(m-1)n}+G_{(m+1)n})-k_{149}\cdot B_{mn} \quad (50)$$

In short, color difference signals $R-Y_{mn}$ in picture elements corresponding to filters $B_{03}$, $B_{07}$, $B_{11}$, $B_{15}$, $B_{23}$, $B_{27}$, $B_{31}$, $B_{35}$, $B_{43}$, $B_{47}$, $B_{51}$, $B_{55}$, $B_{63}$, $B_{67}$, $B_{71}$, $B_{75}$, $B_{83}$, $B_{87}$, etc., in FIG. 3 are calculated by the equation (50). For example, color difference signals $R-Y_{11}$, $R-Y_{31}$ and $R-Y_{23}$ in picture elements corresponding to the filters $B_{11}$, $B_{31}$ and $B_{23}$ as shown in FIG. 10 are calculated by the equation (50) as follows.

$R-Y_{11}=k_{146}\cdot(R_{01}+R_{21})+k_{147}\cdot G_{12}-k_{148}\cdot(G_{02}+G_{22})-k_{149}\cdot B_{11},$ $R-Y_{31}=k_{146}\cdot(R_{21}+R_{41})+k_{147}\cdot G_{32}-k_{148}\cdot(G_{22}+G_{42})-k_{149}\cdot B_{31},$ and $R-Y_{23}=k_{146}\cdot(R_{13}+R_{33})+k_{147}\cdot G_{24}-k_{148}\cdot(G_{14}+G_{34})-k_{149}\cdot B_{23}.$ All color difference signals in intersections of other G/B rows and B columns are formed in the same manner as described above. According to the equation (50), the respective color difference signal is formed based on six chrominance signals with a G/B-row B-column blue chrominance signal $B_{mn}$ as the center thereof, that is, $B_{mn}$, $R_{(m-1)n}$, $R_{(m+1)n}$, $G_{(m-1)(n+1)}$, $G_{(m+1)(n+1)}$ and $B_{m(n+1)}$.

In the following, a theory of formation of another color difference signal $B-Y$ is described.

In FIG. 3, a color difference signal $B-Y_{mn}$ corresponding to a picture element G in a portion where a filter G is followed by an adjacent filter R is calculated by the equation (51).

$$B - Y_{mn} = -k_{150}\cdot R_{m(n+1)} + k_{151}\cdot G_{mn} - k_{152}\cdot(G_{(m-1)n} + G_{(m+1)n}) + k_{153}\cdot(B_{(m-1)(n+1)} + B_{(m+1)(n+1)}) \quad (51)$$

In short, color difference signals in picture elements corresponding to filters $G_{00}$, $G_{04}$, $G_{12}$, $G_{16}$, $G_{20}$, $G_{24}$, $G_{32}$, $G_{36}$, $G_{40}$, $G_{44}$, $G_{52}$, $G_{56}$, $G_{60}$, $G_{64}$, $G_{72}$, $G_{76}$, $G_{80}$, $G_{84}$, etc., in FIG. 3 are calculated by the equation (51). For example, color difference signals $B-Y_{20}$, $B-Y_{12}$ and $B-Y_{32}$ in picture elements corresponding to the filters $G_{20}$, $G_{12}$ and $G_{32}$ are calculated by the equation (51) as follows.

$$B-Y_{20} = -k_{150} \cdot R_{21} + k_{151} \cdot G_{20} - k_{152} \cdot (G_{10} + G_{30}) + k_{153} \cdot (B_{11} + B_{31}),$$

$$B-Y_{12} = -k_{150} \cdot R_{13} + k_{151} \cdot G_{12} - k_{152} \cdot (G_{02} + G_{22}) + k_{153} \cdot (B_{03} + B_{23}), \text{ and}$$

$$B-Y_{32} = -k_{150} \cdot R_{33} + k_{151} \cdot G_{32} - k_{152} \cdot (G_{22} + G_{42}) + k_{153} \cdot (B_{23} + B_{43}).$$

All color difference signals in intersections of other G/R rows and G columns are formed in the same manner as described above. According to the equation (51), the respective color difference signal is formed based on six chrominance signals with a G/R-row G-column green chrominance signal $G_{mn}$ as the center thereof, that is, $G_{mn}$, $R_{m(n+1)}$, $G_{(m-1)n}$, $G_{(m+1)n}$, $B_{(m-1)(n+1)}$ and $B_{(m+1)(n+1)}$.

In FIG. 3, a color difference signal $B-Y_{mn}$ corresponding to a picture element R in a portion where filters G and R are adjacent to each other is calculated by the equation (52).

$$B - Y_{mn} = -k_{154} \cdot R_{mn} + k_{155} \cdot G_{m(n+1)} - k_{156} \cdot (G_{(m-1)(n+1)} + G_{(m-1)(n+1)}) + k_{157} \cdot (B_{(m-1)n} + B_{(m+1)n}) \quad (52)$$

In short, color difference signals $B-Y_{mn}$ in picture elements corresponding to filters $R_{01}$, $R_{05}$, $R_{13}$, $R_{17}$, $R_{21}$, $R_{25}$, $R_{33}$, $R_{37}$, $R_{41}$, $R_{45}$, $R_{53}$, $R_{57}$, $R_{61}$, $R_{65}$, $LR_{73}$, $R_{77}$, $R_{81}$, $R_{85}$, etc., in FIG. 3 are calculated by the equation (52). For example, color difference signals $B-Y_{21}$, $B-Y_{13}$ and $B-Y_{33}$ in picture elements corresponding to the filters $R_{21}$, $R_{13}$ and $R_{33}$ as shown in FIG. 8 are calculated by the equation (52) as follows.

$$B-Y_{21} = -k_{154} \cdot R_{21} + k_{155} \cdot G_{22} - k_{156} \cdot (G_{12} + G_{32}) + k_{157} \cdot (B_{11} + B_{31}),$$

$$B-Y_{13} = -k_{154} \cdot R_{13} + k_{155} \cdot G_{14} - k_{156} \cdot (G_{04} + G_{24}) + k_{157} \cdot (B_{03} + B_{23}), \text{ and}$$

$$B-Y_{33} = -k_{154} \cdot R_{33} + k_{155} \cdot G_{34} - k_{156} \cdot (G_{24} + G_{44}) + k_{157} \cdot (B_{23} + B_{43}).$$

All color difference signals in intersections of other G/R rows and R columns are formed in the same manner as described above. According to the equation (52), the respective color difference signal is formed based on six chrominance signals with a G/R-row R-column red chrominance signal $R_{mn}$ as the center thereof, that is, $R_{mn}$, $G_{m(n+1)}$, $G_{(m-1)(n+1)}$, $G_{(m+1)(n+1)}$, $B_{(m-1)n}$, and $B_{(m+1)n}$.

In FIG. 3, a color difference signal $B-Y_{mn}$ corresponding to a picture element G in a portion where a filter G followed by an adjacent filter B is calculated by the equation (53).

$$B - Y_{mn} = -k_{158} \cdot (R_{(m-1)(n+1)} + R_{(m+1)(n+1)}) - k_{159} \cdot G_{mn} + k_{160} \cdot (G_{(m-1)n} + G_{(m+1)n}) + k_{161} \cdot B_{m(n+1)} \quad (53)$$

In short, color difference signals $B-Y_{mn}$ in picture elements corresponding to filters $G_{02}$, $G_{06}$, $G_{10}$, $G_{14}$, $G_{22}$, $G_{26}$, $G_{30}$, $G_{34}$, $G_{42}$, $G_{46}$, $G_{50}$, $G_{54}$, $G_{62}$, $G_{66}$, $G_{70}$, $G_{74}$, $G_{82}$, $G_{86}$, etc. in FIG. 3 are calculated by the equation (53). For example, color difference signals $B-Y_{10}$, $B-Y_{30}$ and $B-Y_{22}$ in picture elements corresponding to the filters $G_{10}$, $G_{30}$ and $G_{22}$ as shown in FIG. 9 are calculated by the equation (53) as follows.

$$B-Y_{10} = -k_{158} \cdot (R_{01} + R_{21}) - k_{159} \cdot G_{10} + k_{160} \cdot (G_{00} + G_{20}) + k_{161} \cdot B_{11},$$

$$B-Y_{30} = -k_{158} \cdot (R_{21} + R_{41}) - k_{159} \cdot G_{30} + k_{160} \cdot (G_{20} + G_{40}) + k_{161} \cdot B_{31}, \text{ and}$$

$$B-Y_{22} = -k_{158} \cdot (R_{13} + R_{33}) - k_{159} \cdot G_{22} + k_{160} \cdot (G_{12} + G_{32}) + k_{161} \cdot B_{23}.$$

All color difference signals $B-Y_{mn}$ in intersections of other G/B rows and G columns are formed in the same manner as described above. According to the equation (53), the respective color difference signal is formed based on six chrominance signals with a G/B-row G-column green chrominance signal $G_{mn}$ as the center thereof, that is, $G_{mn}$, $R_{(m-1)(n+1)}$, $R_{(m+1)(n+1)}$, $G_{(m-1)n}$, $G_{(m+1)n}$ and $B_{m(n+1)}$.

In FIG. 3, a color difference signal $B-Y_{mn}$ corresponding to a picture element B in a portion where filters G and B are adjacent to each other is calculated by the equation (54).

$$B - Y_{mn} = -k_{162} \cdot (R_{(m-1)n} + R_{(m-1)n}) - k_{163} \cdot G_{m(n-1)} + k_{164} \cdot (G_{(m-1)n} + G_{(m-1)n}) + k_{165} \cdot B_{mn} \quad (54)$$

In short, color difference signals $B-Y_{mn}$ in picture elements corresponding to filters $B_{03}$, $B_{07}$, $B_{11}$, $B_{15}$, $B_{23}$, $B_{27}$, $B_{31}$, $B_{35}$, $B_{43}$, $B_{47}$, $B_{51}$, $B_{55}$, $B_{63}$, $B_{67}$, $B_{71}$, $B_{75}$, $B_{83}$, $B_{87}$, etc., in FIG. 3 are calculated by the equation (54). For example, color difference signals $B-Y_{11}$, $B-Y_{31}$ and $B-Y_{23}$ in picture elements corresponding to the filters $B_{11}$, $B_{31}$ and $B_{23}$ as shown in FIG. 10 are calculated by the equation (54) as follows.

$$B-Y_{11} = -k_{162} \cdot (R_{01} + R_{21}) - k_{163} \cdot G_{12} + k_{164} \cdot (G_{02} + G_{22}) + k_{165} \cdot B_{11},$$

$$B-Y_{31} = -k_{162} \cdot (R_{21} + R_{41}) - k_{163} \cdot G_{32} + k_{164} \cdot (G_{22} + G_{42}) + k_{165} \cdot B_{31}, \text{ and}$$

$$B-Y_{23} = -k_{162} \cdot (R_{13} + R_{33}) - k_{163} \cdot G_{24} + k_{164} \cdot (G_{14} + G_{34}) + k_{165} \cdot B_{23}.$$

All color difference signals in intersections of other G/B rows and B columns are formed in the same manner as described above. According to the equation (54), the respective color difference signal is formed based on six chrominance signals with a G/B-row B-column blue chrominance signal $B_{mn}$ as the center thereof, that is, $B_{mn}$, $R_{(m-1)n}$, $R_{(m+1)n}$, $G_{(m-1)(n+1)}$, $G_{(m+1)(n+1)}$ and $B_{m(n+1)}$.

When the aforementioned arithmetic operation represented by the equations (47) through (54) is made based on chrominance signals pertaining to six adjacent picture elements, reproducibility can be improved to reduce occurrence of spurious colors as compared with the case where the color difference signal is formed based on three or four chrominance signals.

In the present invention having such signal processing means, an interpolational arithmetic operation is made based on a plurality of chrominance signals generated from adjacent picture elements, so that an optical image of a subject containing higher frequency components than the sampling frequency of a filter provided in an image pickup device can be reproduced with higher accuracy as compared with the prior art. In short, it is possible to improve vertical resolution of high-band luminance signals and vertical resolution of low-band luminance signals and to improve the reproducibility of color difference signals to thereby reduce occurrence of spurious colors.

Figure 11:
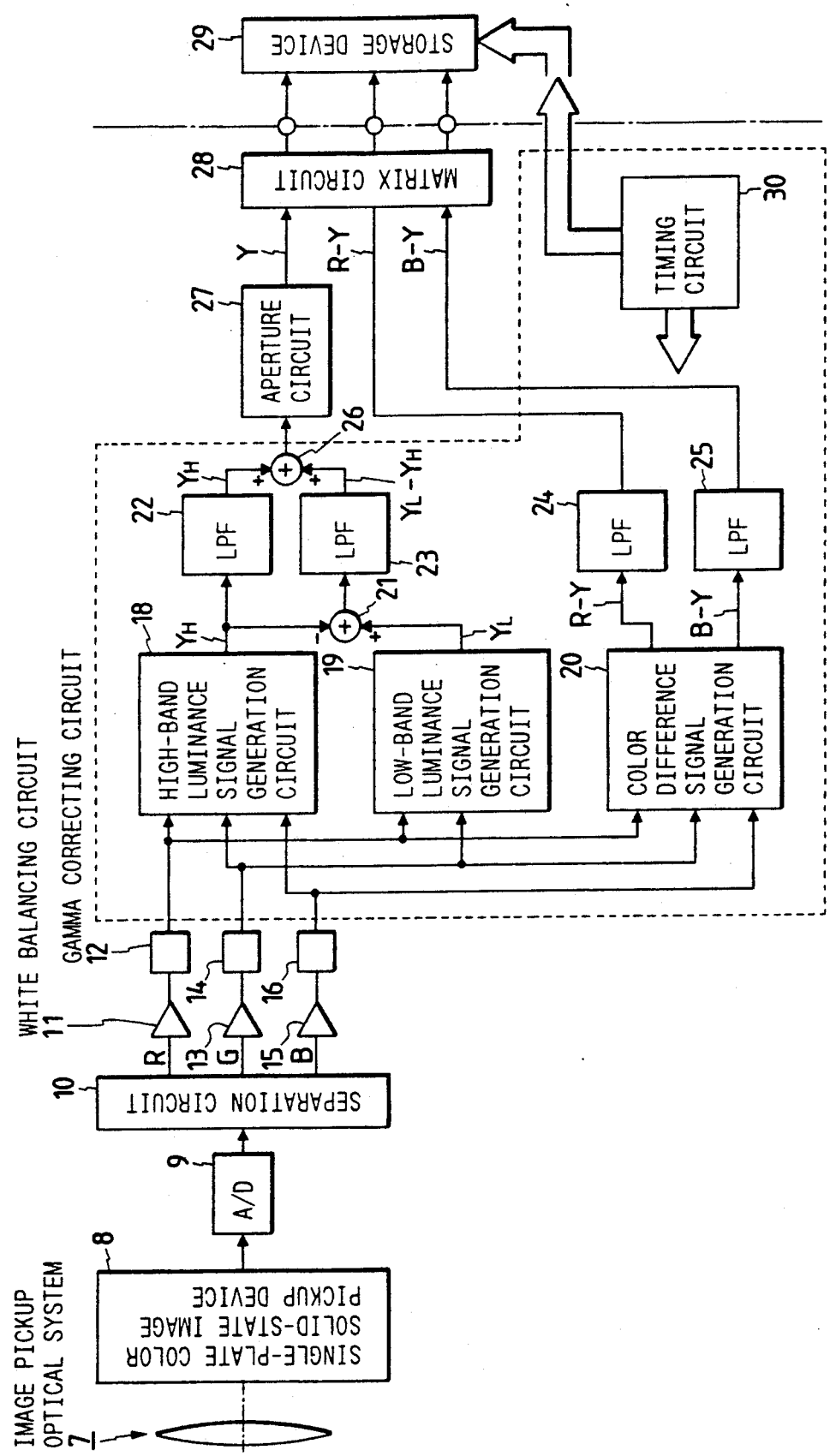
FIG. 11 is a block diagram illustrating a further specific configuration of an embodiment of the present invention.

An embodiment according to the present invention will be described with reference to FIG. 11. This embodiment relates to an electronic still camera for recording a still image on a recording medium such as a semiconductor memory or the like. Describing the construction thereof with reference to the drawing, the reference numeral 7 designates an image pickup optical system including an image pickup lens. A single plate color solid-state image pickup device 8 is arranged in the back of the image pickup optical system 7. The single plate color solid-state image pickup device 8 is a charge-storage solid-state image pickup device in which a green striped red/blue perfectly checkered color filter means as shown in FIG. 3 is provided on a picture element group in the light-receiving plane thereof. The reference numeral 9 designates an A/D converter for performing analog-to-digital conversion on a picture signal synchronously read by vertical scanning and horizontal scanning.

The reference numeral 10 designates a separation circuit which is a color separation circuit for separating time-series R, G and B picture signals obtained by the A/D converter 9 to transfer the signals to predetermined output contacts. For example, the separation circuit 10 is formed of a demultiplexer. The red (R) chrominance signal from the color separation circuit 10 is transferred through a white balancing circuit 11 and a $\gamma$ correction circuit 12. The green (G) chrominance signal is transferred through a white balancing circuit 13 and a $\gamma$ correction circuit 14. The blue (B) chrominance signal is transferred through a white balancing circuit 15 and a $\gamma$ correction circuit 16.

A portion 17 represented by the dot line is a signal processor unitedly formed as an integrated circuit (IC) including a matrix circuit, a color difference signal generation circuit, adders, and filters. That is to say, the reference numeral 18 designates a high-band luminance signal generation circuit for forming a high-band luminance signal $Y_H$, 19 a low-band luminance signal generation circuit for forming a low-band luminance signal $Y_L$ and 20 a color difference signal generation circuit for forming color difference signals $R-Y$ and $B-Y$. The high-band luminance signal generation circuit 18 performs an arithmetic operation according to the aforementioned equations (1) through (3) or (4) through (6) based on chrominance signals R, G and B after white balancing. The low-band luminance signal generation circuit 19 performs an arithmetic operation according to the aforementioned equations (7) through (10), (19) through (22), (31) through (34) or (43) through (46) based on chrominance signals R, G and B after white balancing. The color difference signal generation circuit 20 performs an arithmetic operation according to the aforementioned equations (11) through (18), (23) through (30), (35) through (42) or (47) through (54) based on chrominance signals R, G and B after white balancing. The reference numeral 21 designates an addition/subtraction circuit for subtracting the high-band luminance signal $Y_H$ from the low-band luminance signal $Y_L$ to generate a signal $Y_L-Y_H$.

The reference numeral 22 designates a low-pass filter having a cut-off frequency $f_H$ within a range of from 5 MHz to 6.5 MHz for limiting the band of the high-band luminance signal $Y_H$. The reference numeral 23 designates a low-pass filter having a cut-off frequency $f_M$ within a range of from 0.7 MHz to 1.5 MHz for limiting the band of the signal $Y_L-Y_H$. The reference numeral 24 designates a low-pass filter having a cut-off frequency $f_L$ within a range of from 0.5 MHz to 1 MHz for limiting the band of the color difference signal $R-Y$. The reference numeral 25 designates a low-pass filter having a cut-off frequency $f_L$ within a range of from 0.5 MHz to 1 MHz for limiting the band of the color difference signal $B-Y$. The reference numeral 26 designates an addition circuit for adding the high-band luminance signal $Y_H$ and the signal $Y_L-Y_H$ obtained from the low-pass filters 22 and 23, to thereby form a luminance signal Y having a frequency characteristic as shown in FIG. 2(d). The luminance signal Y is passed through an aperture circuit 27 for compensating aperture strain. In short, the signal processing circuit 17 forms a luminance signal Y and color difference signals $R-Y$ and $B-Y$ having frequency characteristics as shown in FIGS. 2(c) and 2(d).

This embodiment is constructed so that independent chrominance signals R, G and B are formed by feeding the thus generated luminance signal Y and color difference signals $R-Y$ and $B-Y$ back to the matrix circuit 28 and are recorded in a storage device 29 having storage areas corresponding to the respective colors. For example, the storage device 29 is provided in the form of a semiconductor memory or a so-called memory card having the same function as a semiconductor memory. Recording timing and operating timing for the signal processor 17 is controlled according to a synchronizing signal generated from a timing circuit 30.

In the following, the operation of this embodiment constructed as described above is described.

Respective chrominance signals R, G and B generated from the solid-state image pickup device 8, converted into digital signals by the A/D converter 10 and obtained through the white balancing and $\gamma$ correction circuits 11 to 16 are fed to the high-band luminance signal generation circuit 18, the low-band luminance signal generation circuit 19 and the color difference signal generation circuit 20.

In the case where the equations (1) through (3) are used in the high-band luminance signal generation circuit 18, the load factors $k_{01}$ to $k_{03}$ are established as follows.

$$k_{01}=k_{02}k_{03}=0.5$$

In the case where the equations (4) through (6) are used in the high-band luminance signal generation circuit 18, the load factors $k_{04}$ to $k_{09}$ are established as follows.

$$K_{04}=k_{06}=k_{08}=0.05$$

$$k_{05}=k_{07}=k_{09}=0.05$$

In the case where the equations (7) through (10) are used in the low-band luminance signal generation circuit 19, the load factors $k_{10}$ to $k_{21}$ are established as follows.

$$k_{10}=k_{13}=k_{16}=k_{19}=0.3$$

$$k_{11}=k_{14}=k_{17}=k_{20}=0.59$$

$k_{12}=k_{15}=k_{18}=k_{21}=0.11$

In the case where the equations (19) through (22) are used in the low-band luminance signal generation circuit 19, the load factors $k_{46}$ to $k_{57}$ are established as follows.

$k_{46}=k_{49}=k_{52}=k_{55}=0.3$ $k_{47}=k_{50}=k_{53}=k_{56}=0.295$ $k_{48}=k_{51}=k_{54}=k_{57}=0.11$

In the case where the equations (31) through (34) are used in the low-band luminance signal generation circuit 19, the load factors $k_{82}$ to $k_{94}$ are established as follows.

$k_{82}=k_{85}=0.3$ $k_{83}=k_{86}=0.59$ $k_{84}=k_{87}=0.55$ $k_{89}=k_{92}=0.15$ $k_{90}=k_{93}=0.90$ $k_{91}=k_{94}=0.11$

In the case where the equations (43) through (46) are used in the low-band luminance signal generation circuit 19, the load factors $k_{118}$ to $k_{133}$ are established as follows.

$k_{118}=k_{122}=0.3$ $k_{119}=k_{123}=0.7$ $k_{120}=k_{124}=k_{121}=k_{125}=0.055$ $k_{126}=k_{130}=k_{132}=0.15$ $k_{127}=k_{131}=0.89$ $k_{129}=k_{133}=0.11$

In the case where the equations (11) through (18) are used in the color difference signal generation circuit 20, the load factors $k_{22}$ to $k_{45}$ are established as follows.

$k_{22}=k_{25}=k_{28}=k_{31}=0.7$ $k_{23}=k_{26}=k_{29}=k_{32}=0.59$ $k_{24}=k_{27}=k_{30}=k_{33}=0.11$ $k_{34}=k_{37}=k_{40}=k_{43}=0.3$ $k_{35}=k_{38}=k_{41}=k_{44}=0.59$ $k_{36}=k_{39}=k_{42}=k_{45}=0.89$

In the case where the equations (23) through (30) are used in the color difference signal generation circuit 20, the load factors $k_{58}$ to $k_{81}$ are established as follows.

$k_{58}=k_{61}=k_{64}=k_{67}=0.7$ $k_{59}=k_{62}=k_{65}=k_{66}=0.295$ $k_{60}=k_{63}=k_{66}=k_{69}=0.11$ $k_{70}=k_{73}=k_{76}=k_{79}=0.3$ $k_{71}=k_{74}=k_{77}=k_{80}=0.295$ $k_{72}=k_{75}=k_{78}=k_{81}=0.89$

In the case where the equations (35) through (42) are used in the color difference signal generation circuit 20, the load factors $k_{94}$ to $k_{117}$ are established as follows.

$k_{94}=k_{97}=0.7$ $k_{94}=k_{98}=0.59$ $k_{96}=k_{99}=0.055$ $k_{100}=k_{103}=0.35$ $k_{101}=k_{104}=0.59$ $k_{102}=k_{105}=0.11$ $k_{106}=k_{109}=0.3$ $k_{107}=k_{110}=0.59$ $k_{108}=k_{111}=0.445$ $k_{112}=k_{115}=0.15$ $k_{113}=k_{116}=0.59$ $k_{114}=k_{117}=0.89$

In the case where the equations (47) through (54) are used in the color difference signal generation circuit 20, the load factors $k_{134}$ to $k_{165}$ are established as follows.

$k_{134}=k_{138}=0.7$ $k_{135}=k_{139}=0.7$ $k_{136}=k_{140}=0.055$ $k_{137}=k_{141}=0.055$ $k_{142}=k_{146}=0.35$ $k_{143}=k_{147}=0.11$ $k_{144}=k_{148}=0.35$ $k_{145}=k_{149}=0.11$ $k_{150}=k_{154}=0.3$ $k_{151}=k_{155}=0.3$ $k_{152}=k_{156}=0.445$ $k_{153}=k_{157}=0.445$ $k_{158}=k_{162}=0.15$ $k_{159}=k_{163}=0.89$ $k_{160}=k_{164}=0.15$ $k_{161}=k_{165}=0.89$

The values and sizes of the load factors $k_{01}$ to $k_{165}$ are established under the consideration of the characteristic of human eyes.

When high-band luminance, low-band luminance and color difference signals are formed based on chrominance signals pertaining to adjacent picture elements, horizontal resolution in the high-band luminance signal, vertical resolution in the low-band luminance signal and reproducibility in the color difference signals can be improved to attain reduction of spurious colors.

As described above, according to the present invention, an interpolational arithmetic operation is made based on a plurality of chrominance signals generated from adjacent picture elements, so that an optical image of a subject containing higher frequency components than the sampling frequency of a filter provided in an image pickup device can be reproduced with high accuracy as compared with the prior art. Accordingly, horizontal resolution of the high-band luminance signal, vertical resolution of the low-band luminance signal and reproducibility of the color difference signals can be improved to reduce occurrence of spurious colors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing system comprising:
   an image pickup device including a mosaic-arrangement color filter means provided on picture elements in a light-receiving plane thereof, said color filter means being constituted by a first group of fine filters provided on a group of picture elements in odd or even columns so as to be arrayed in the form of stripes in a vertical scanning direction, and second and third groups of fine filters provided on other picture elements between said first group of fine filters so as to be arrayed alternatively in vertical and horizontal scanning directions; and
   a signal processing means for forming a high-band luminance signal based on chrominance signals read from said image pickup device,
   the improvement in which said signal processing means forms said high-band luminance signal corresponding to an arbitrary picture element by performing an arithmetic operation in which a signal generated from said arbitrary picture element and a signal generated from another picture element vertically adjacent to said arbitrary picture element are added to each other after they are multiplied by respective suitable load factors.

2. An image processing system according to claim 1, in which said signal processing means forms said high-band luminance signal based on signals respectively generated from two picture elements which are vertically adjacent to each other.

3. An image processing system according to claim 1, in which said signal processing means forms said high-band luminance signal based on three signals respectively generated from a certain picture element and two picture elements located on vertically opposite sides of said certain picture element.

4. An image processing system of claim 1 wherein the signal processing means comprises a luminance signal synthesizing means for forming a luminance signal containing frequency components in specific high frequency bands, said luminance signal formed by combining high-band luminance signals formed by said signal processing means while limiting said high-band luminance signals into said specific frequency bands.

5. An image processing system of claim 4 further comprising a color signal processing means for forming a color difference signal based on chrominance signals read from said image pickup device, wherein said color signal processing means forms said color difference signal corresponding to an arbitrary picture element by performing an arithmetic operation in which a signal generated from said arbitrary picture element and a plurality of signals generated from picture elements horizontally, vertically and diagonally adjacent to one another with respect to said arbitrary picture element are added to each other after those signals are multiplied with respective suitable load factors.

6. An image processing system comprising:
   an image pickup device including a mosaic-arrangement color filter means provided on picture elements in a light-receiving plane thereof, said color filter means being constituted by a first group of fine filters provided on a group of picture elements in odd or even columns so as to be arrayed in the form of stripes in a vertical scanning direction, and second and third groups of fine filters provided on other picture elements between said first group of fine filters so as to be arrayed alternately in vertical and horizontal scanning directions; and
   a signal processing means for forming a low-band luminance signal based on chrominance signals read from said image pickup device,
   the improvement in which said signal processing means forms said low-band luminance signal corresponding to an arbitrary picture element by performing an arithmetic operation in which a signal generated from said arbitrary picture element and a plurality of signals generated from picture elements horizontally, vertically and diagonally adjacent to one another with respect to said arbitrary picture element are added to each other after those signals are multiplied with respective suitable load factors.

7. An image processing system according to claim 6 in which said signal processing means forms said low-band luminance signal based on three signals respectively generated from said arbitrary picture element and two other picture elements adjacent to said arbitrary picture element.

8. An image processing system according to claim 6 in which said signal processing means forms said low-band luminance signal based on four signals respectively generated from said arbitrary picture element and three other picture elements adjacent to said arbitrary picture element.

9. An image processing system according to claim 6 in which said signal processing means forms said low-band luminance signal based on six signals respectively generated from said arbitrary picture element and five other picture elements adjacent to said arbitrary picture element.

10. An image processing system of claim 6 wherein the signal processing means comprises a luminance signal synthesizing means for forming a luminance signal containing frequency components in specific low frequency bands, said luminance signal formed by combining low-band luminance signals formed by said signal processing means while limiting said low-band luminance signals into said specific frequency bands.

11. An image processing system of claim 10 further comprising a color signal processing means for forming a color difference signal based on chrominance signals read from said image pickup device, wherein said color signal processing means forms said color difference signal corresponding to an arbitrary picture element by performing an arithmetic operation in which a signal generated from said arbitrary picture element and a plurality of signals generated from picture elements horizontally, vertically and diagonally adjacent to one another with respect to said arbitrary picture element are added to each other after those signals are multiplied with respective suitable load factors.

12. An image processing system comprising:
an image pickup device including a mosaic-arrangement color filter means provided on picture elements in a light-receiving plane thereof, said color filter means being constituted by a first group of fine filters provided on a group of picture elements in odd or even columns so as to be arrayed in the form of stripes in a vertical scanning direction, and second and third groups of fine filters provided on other picture elements between said first group of fine filters so as to be arrayed alternately in vertical and horizontal scanning directions; and
a signal processing means for forming a color difference signal based on chrominance signals read from said image pickup device,
the improvement in which said signal processing means forms said color difference signal corresponding to an arbitrary picture element by performing an arithmetic operation in which a signal generated from said arbitrary picture element and a plurality of signals generated from picture elements horizontally, vertically and diagonally adjacent to one another with respect to said arbitrary picture element are added to each other after those signals are multiplied with respective suitable load factors.

13. An image processing system according to claim 12 in which said signal processing means forms said color difference signal based on three signals respectively generated from said arbitrary picture element and two other picture elements adjacent to said arbitrary picture element.

14. An image processing system according to claim 12 in which said signal processing means forms said color difference signal based on four signals respectively generated from said arbitrary picture element and three other picture elements adjacent to said arbitrary picture element.

15. An image processing system according to claim 12 in which said signal processing means forms said color difference signal based on six signals respectively generated from said arbitrary picture element and five other picture elements adjacent to said arbitrary picture element.

* * * * *